(12) United States Patent
Kobayashi et al.

(10) Patent No.: US 8,337,025 B2
(45) Date of Patent: Dec. 25, 2012

(54) PROJECTION TYPE DISPLAY DEVICE AND IMAGE DISPLAYING METHOD

(75) Inventors: Manabu Kobayashi, Saitama-ken (JP); Ryusaku Takahashi, Kanagawa-ken (JP); Toshitaka Murata, Kanagawa-ken (JP); Takatsugu Aizaki, Kanagawa-ken (JP); Masahiko Miyake, Kanagawa-ken (JP); Hironobu Fukutomi, Kanagawa-ken (JP)

(73) Assignee: JVC Kenwood Corporation, Yokohama-shi, Kanagawa (JP)

( * ) Notice: Subject to any disclaimer, the term of this patent is extended or adjusted under 35 U.S.C. 154(b) by 437 days.

(21) Appl. No.: 12/458,991

(22) Filed: Jul. 29, 2009

(65) Prior Publication Data

US 2009/0290127 A1 Nov. 26, 2009

(30) Foreign Application Priority Data

Jul. 30, 2008 (JP) ................ P2008-196507
Nov. 5, 2008 (JP) ................ P2008-284152

(51) Int. Cl.
*G03B 21/14* (2006.01)
*G03B 21/26* (2006.01)
*G03B 21/28* (2006.01)
*G03B 21/56* (2006.01)
*H04N 5/64* (2006.01)

(52) U.S. Cl. .............. 353/79; 353/99; 353/37; 359/449; 359/460; 359/446; 348/840

(58) Field of Classification Search ............. 353/79, 353/98–99, 37; 359/443, 449, 460, 446; 348/588, 840

See application file for complete search history.

(56) References Cited

U.S. PATENT DOCUMENTS

| 6,750,832 B1 | 6/2004 | Kleinschmidt |
| 2004/0150888 A1 | 8/2004 | Domjan et al. |
| 2006/0071877 A1 | 4/2006 | Kanamori et al. |
| 2006/0268233 A1 | 11/2006 | Sato |
| 2007/0097319 A1* | 5/2007 | McKay et al. ............ 353/7 |
| 2007/0285585 A1* | 12/2007 | Nakamura et al. ......... 348/744 |

FOREIGN PATENT DOCUMENTS

| JP | 2005-201964 A | 7/2005 |
| JP | 2006-011237 A | 1/2006 |
| WO | WO 2008/010651 A1 | 1/2008 |

OTHER PUBLICATIONS

Official Action issued on Jun. 29, 2012 in the counterpart Japanese application.

* cited by examiner

*Primary Examiner* — Georgia Y Epps
*Assistant Examiner* — Magda Cruz
(74) *Attorney, Agent, or Firm* — Nath, Goldberg & Meyer; Jerald L. Meyer; Scott C. Langford

(57) ABSTRACT

A projection type display device includes a image displaying element having image display areas for displaying a plurality of images respectively, a projection optical system having an emitting part for emitting projection light flux to the image display areas of the image displaying element, and a plurality of screens for displaying projected images by the projection light flux transmitted through the image display areas of the image displaying element. In the projection type display device, the image display areas are formed in respective areas in the image displaying element independent of each other. The projected images on the screens correspond to the image display areas, respectively. Each of the screens is arranged in such a position that the each of the screens is not overlapped with shadows of the other screens which are produced since the projection light flux is emitted from the emitting part to the screens.

6 Claims, 16 Drawing Sheets

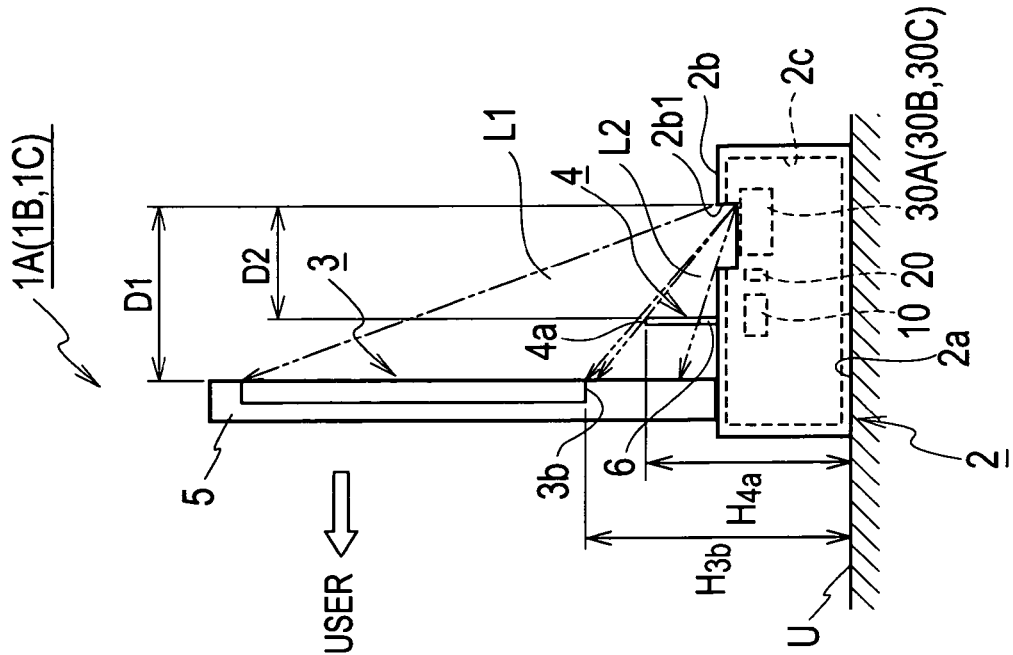
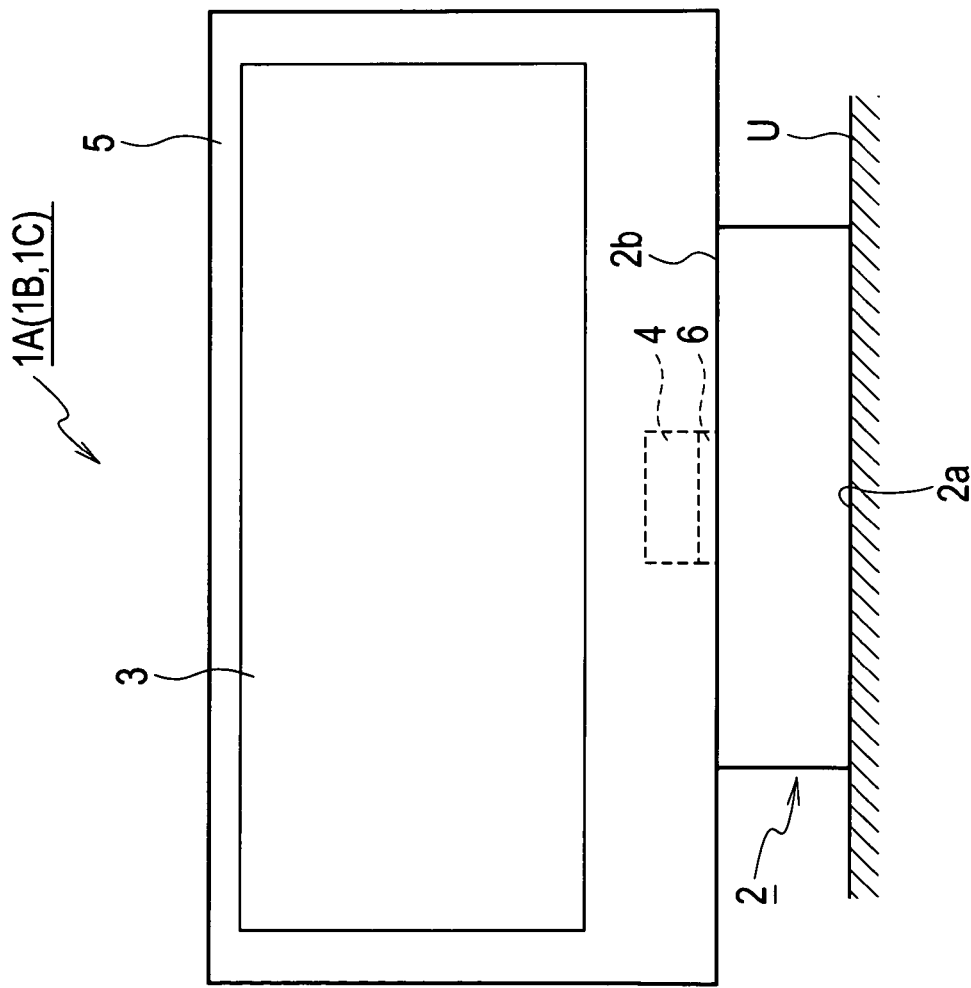

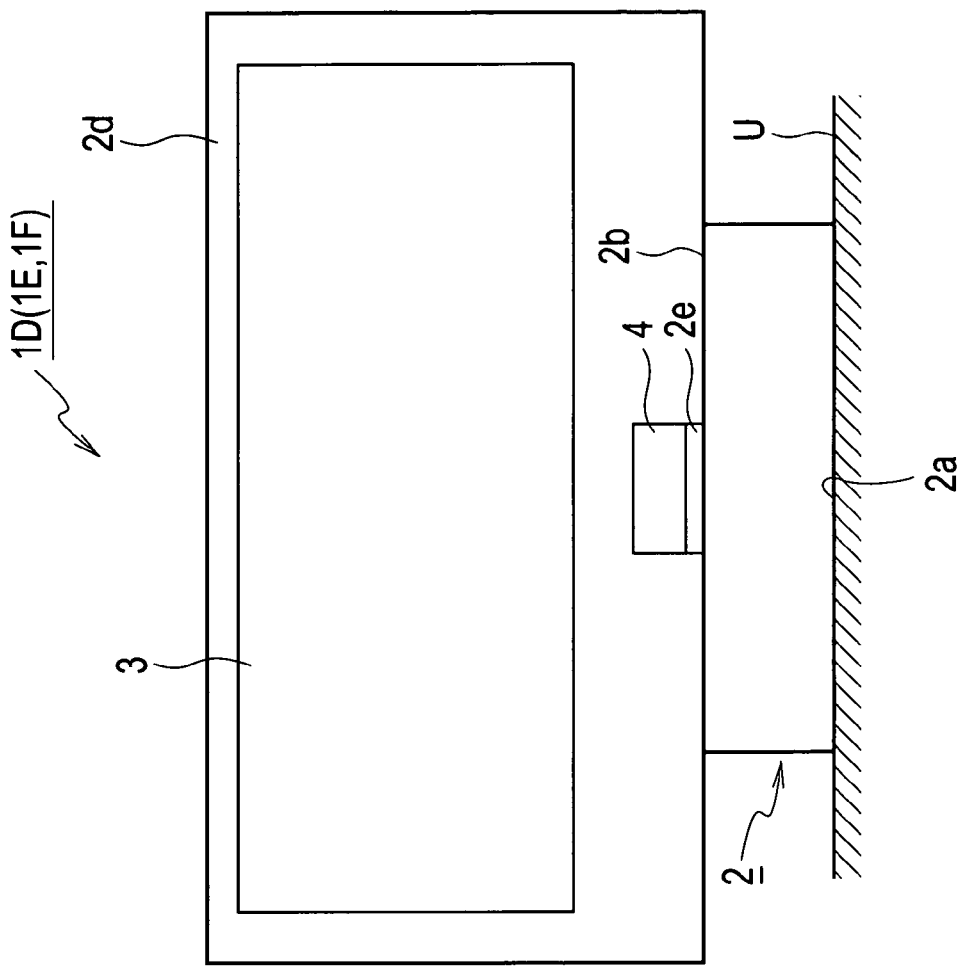
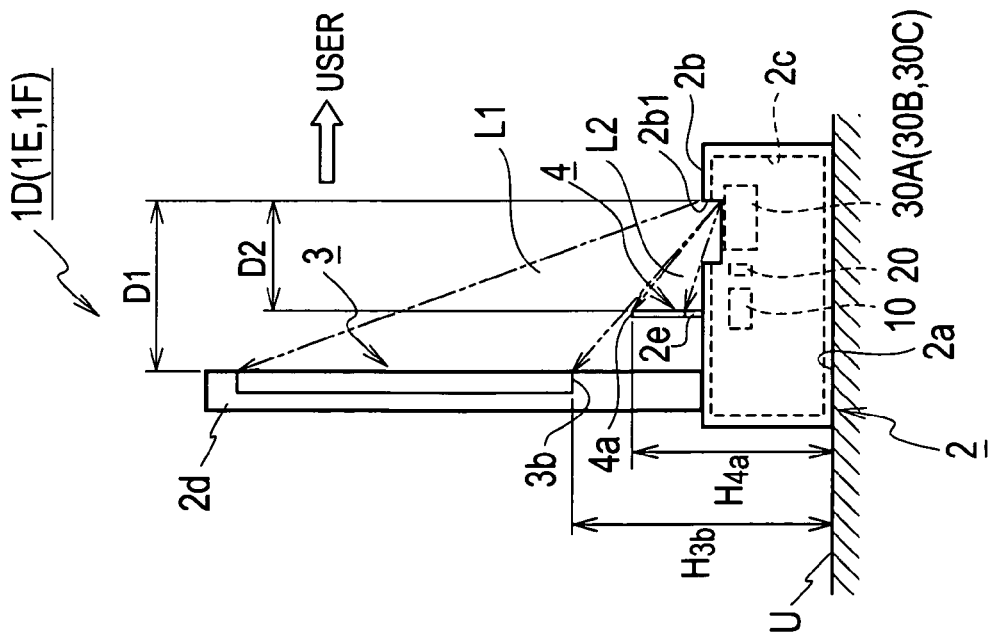

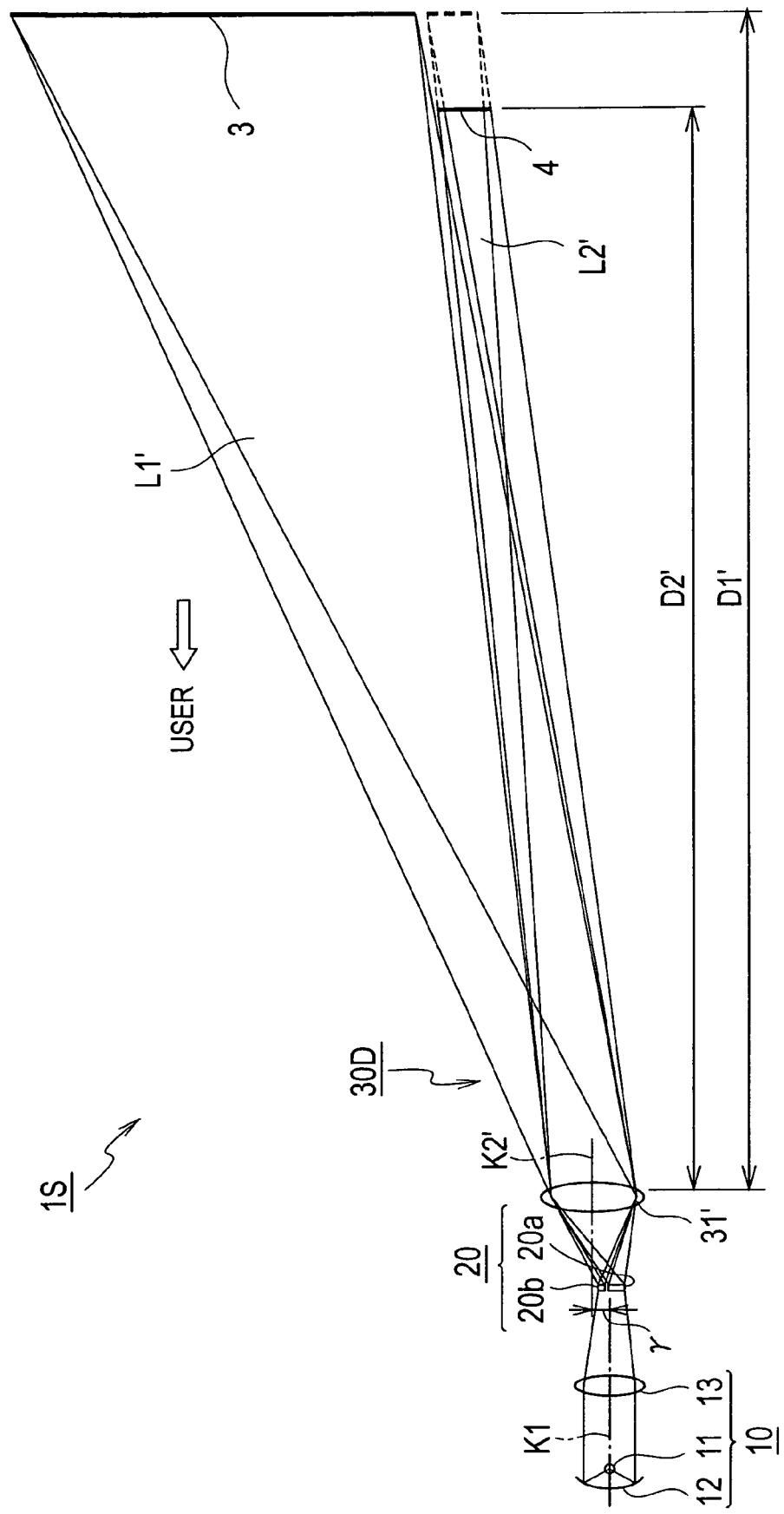

PROJECTION TYPE DISPLAY DEVICE AND IMAGE DISPLAYING METHOD

BACKGROUND OF THE INVENTION

1. Field of the Invention

The present invention relates to a projection type display device which utilizes one optical unit including an optical system for illumination, image displaying elements, and an optical system for projecting thereby to project a plurality of images, which are displayed on a plurality of image areas established in one image displaying element, to a plurality of screens. The present invention further relates to an image displaying method of displaying the above images on the screens.

2. Description of the Related Art

Projection type display devices (i.e. projectors) are adapted to project an image on a screen such that the image is displayed in a liquid crystal panel as being a type of image displaying element (light modulation element) and enlarged by an optical system for projecting. Such projectors conventionally have a variety of structures. These projectors are in heavy usage for families and business scenes. The projection type display devices are roughly classified to front projection type display devices for each projecting an image on a screen from before and rear projection type display devices for each projecting an image on a screen from behind. In these projection type display devices, there is normally adopted a structural form for projecting an image displayed in one image displaying element on a screen in enlargement. In some applications, there also exists a structural form for displaying an image on first and second screens in enlargement with the use of a projector. Such a structural form is disclosed in Japanese Patent Publication Laid-open No. 2006-11237.

FIG. 1 is a structural view showing a display system as an example of the conventional projection type display device. FIG. 2 is a view showing an image displayed in a liquid crystal panel in a projector of FIG. 1. In addition, FIGS. 3A and 3B are views each showing a video split device of FIG. 1.

In FIG. 1, the shown display system 100 is disclosed in Japanese Patent Publication Laid-open No. 2006-11237. The display system 100 will be described with reference to this publication in brief.

The display system 100 as one example of the conventional projection type display device of FIG. 1 is arranged in a vehicle such as automobile. The display system 100 includes a projector 110, a video split device 120, a first screen 131, and a second screen 132, all arranged in the vehicle.

The projector 110 is attached to a ceiling inside a vehicle cabin, while the first and second screens 131, 132 are installed in an instrument panel near a driver's seat. The video split device 120 is arranged between the projector 110 and the first and second screens 131, 132 to optically divide projection light flux emitted from the projector 110 into multiple image lights.

In addition, there are arranged various in-car instruments, for example, a navigation system 142, an audio instrument 143, and an air-conditioning apparatus 144, all connected to the projector 110 through a control circuit 141. While, the control circuit 141 outputs video signals to be projected on the projector 110 on receipt of the state information about the in-car instruments.

As shown in FIG. 2, the projector 110 employs a liquid crystal panel 112 as the image displaying element. The liquid crystal panel 112 comprises one image area 112a displaying map information and another image area 112b displaying audio information.

As shown in FIG. 3A, for example, the video split device 120 utilizes a single prism 121 having two reflecting surfaces in order to optically divide projection light flux emitted from the projector 110 into respective directions of the first and second screens 131, 132. Alternatively, as shown in FIG. 3B, the single prism 121 of FIG. 3A may be replaced by two prisms 122, 123 each having a plurality of reflecting surfaces for the same purpose as above.

Then, the video split device 120 divides an image emitted from the projector 110 so that resulting split images are respectively projected on the first screen 131 and the second screen 132. In this way, the disclosed display system 100 is adapted to use the liquid crystal panel (image displaying element) 112 in the projector 110 effectively.

SUMMARY OF THE INVENTION

In the above-mentioned display system 100, however, its manufacturing cost is liable to be expensive due to the presence of the video split device 120 using the prism(s).

Under the above-mentioned situation, an object of the present invention is to provide a projection type display device which utilizes one optical unit including an optical system for illumination, image displaying elements, and an optical system for projecting thereby to project a plurality of images, which are displayed on a plurality of image areas established in one image displaying element, on a plurality of screens, and which can be provided with a simple structure and also manufactured at low cost without such an expensive image split device having prism(s). Further, another object of the present invention is to provide an image displaying method using the projection type display device.

Furthermore, the other object of the present invention is to provide a projection type display device and an image displaying method, both of which enable a sub image to be displayed on a subscreen with depth feel (three-dimensional appearance) in relation to a main image displayed on a main screen.

In order to achieve the above objects, according to the first aspect of the present invention, there is provided a projection type display device comprising: at least one image displaying element having a plurality of image display areas for displaying a plurality of images respectively; a projection optical system having an emitting part for emitting light flux from the image display areas of the image displaying element as projection light flux; and a plurality of screens for displaying projected images thereon by the projection light flux emitted from the emitting part, wherein the image display areas are formed in areas independent of each other in the image displaying element, the projected images on the screens correspond to the image display areas, respectively, and each of the screens is arranged in such a position that the each of the screens is not overlapped with shadows of the other screens which are produced since the projection light flux is emitted from the emitting part to the screens.

According to the second aspect of the present invention, there is also provided a projection type display device comprising: a light source; an image displaying element having a first image display area and a second image display area and optically modulating light flux from the light source by the first image display area and the second image display area based on a first video signal and a second video signal, both inputted from an outside, thereby to produce a first image and a second image; a projection optical system having an emitting part and projecting respective fluxes as projection light flux, which are obtained by optically modulating the light flux by the image displaying element, from the emitting part; a first screen for displaying the first image since the projection light flux is irradiated to the first screen; and a second screen arranged between the emitting part and the first screen for displaying the second image since the projection light flux is irradiated to the second screen, wherein the second screen is arranged in such a position that the first screen is not overlapped with a shadow of the second screen which is produced since the projection light flux emitted from the emitting part is irradiated to the second screen.

According to the third aspect of the present invention, there is also provided an imaging displaying method comprising the steps of: optically modulating light flux emitted from a light source at different areas in an image display area of an image displaying element based on a first video signal and a second video signal, both inputted from an outside, thereby producing first light flux and second light flux; emitting projection light flux containing the first light flux and the second light flux produced from an emitting part of a projection optical system; displaying a first image based on the first video signal on a first screen arranged on an optical path of the first light flux so that at least part of the first screen intersects with the first light flux; and displaying a second image based on the second video signal on a second screen arranged between the first screen and the emitting part on an optical path of the second light flux so that at least part of the second screen intersects with the second light flux.

BRIEF DESCRIPTION OF THE DRAWINGS

FIG. 4A is a front view showing the appearance of a projection type display device in accordance with a first embodiment (first and second modifications of the first embodiment) of the present invention, and FIG. 4B is a right side view showing the appearance of the projection type display device of FIG. 4A;

FIG. 11A is a left side view showing the appearance of a projection type display device in accordance with a second embodiment (first and second modifications of the second embodiment) of the present invention, and FIG. 11B is a front side view showing the appearance of the projection type display device of FIG. 11A;

FIG. 17 is a view typically showing the arrangement of respective optical members in a projection type display device in accordance with a fourth embodiment of the present invention.

DETAILED DESCRIPTION OF THE PREFERRED EMBODIMENTS

With reference to FIGS. 4A to 17, there will be described below projection type display devices and image displaying methods according to the present invention in order of the first embodiment, the second embodiment, the third embodiment and the fourth embodiment.

[$1^{st}$. Embodiment]

($1^{st}$. Embodiment of Light Source Device)

Figure 5:
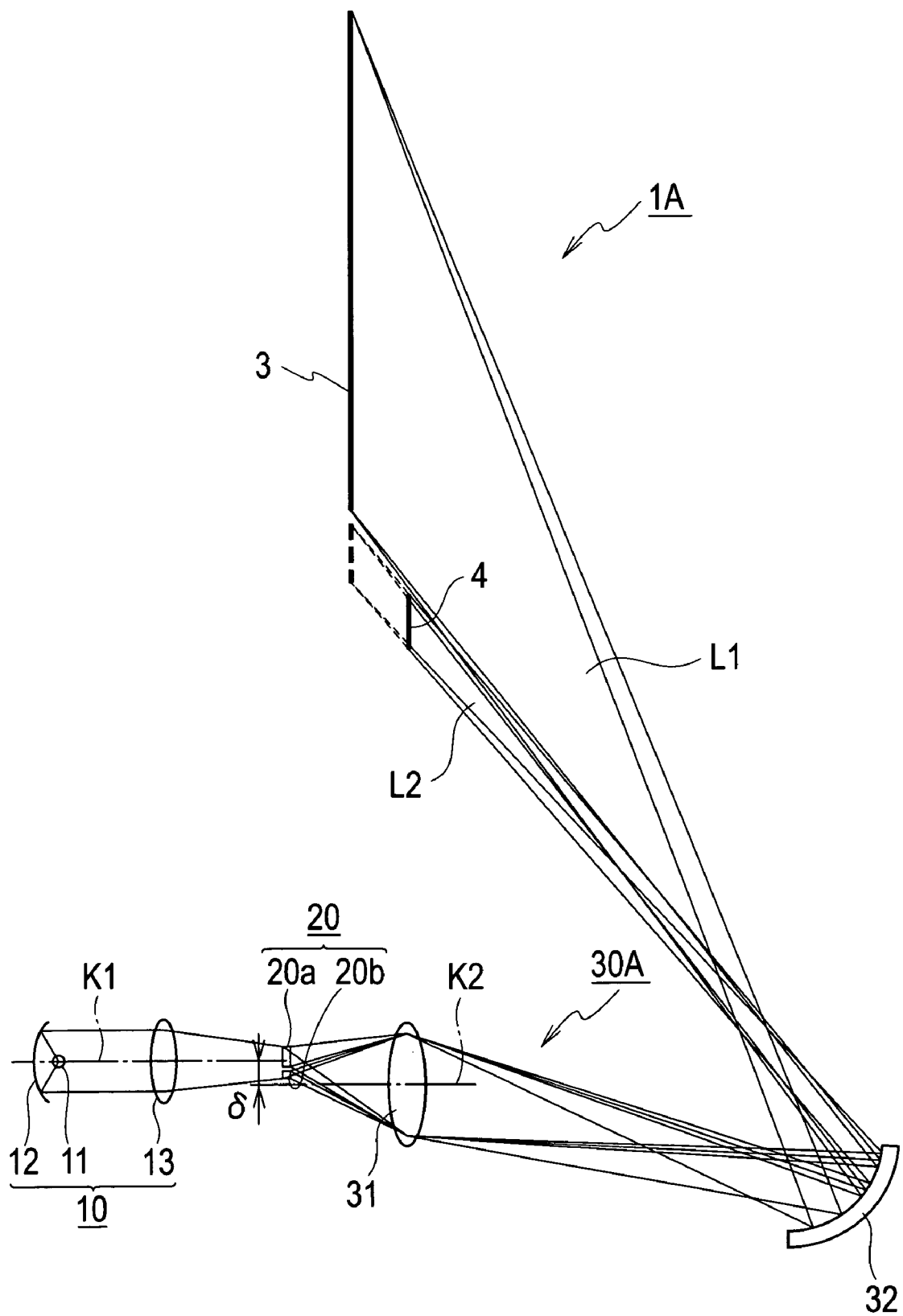
FIG. 5 is a view typically showing the arrangement of respective optical members in the projection type display device of the first embodiment of the present invention.
Figure 6:
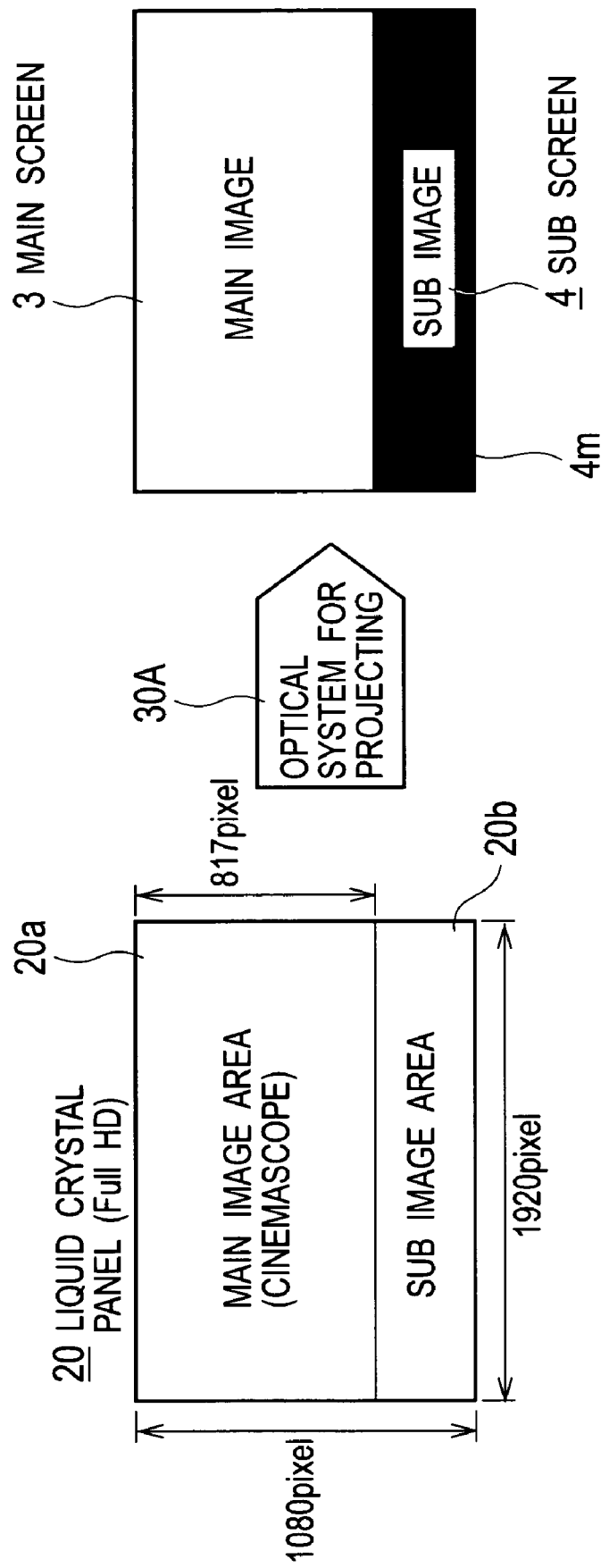
FIG. 6 is a view typically showing a first form where main and sub image areas of the liquid crystal panel are respectively projected on a main screen and a subscreen by an optical system for projecting in the projection type display device of the first embodiment of the present invention.
Figure 7:
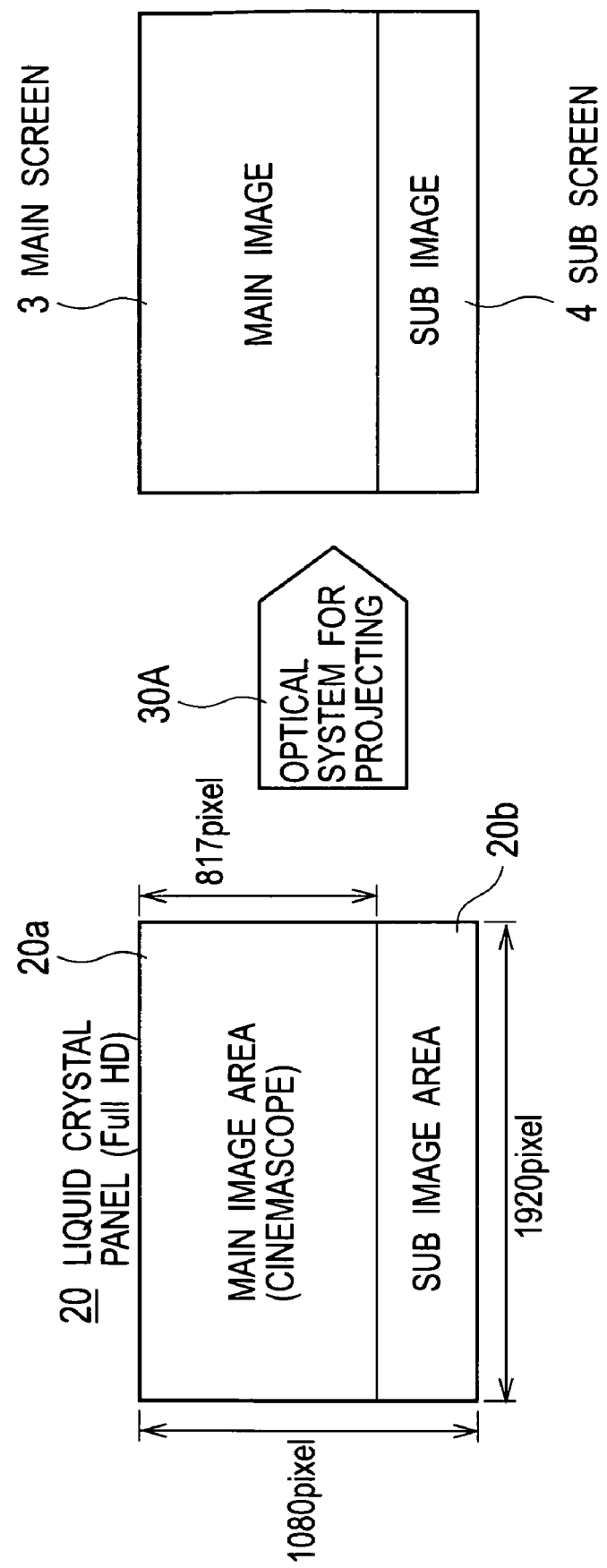
FIG. 7 is a view typically showing a second form where the main and sub image areas of the liquid crystal panel are respectively projected on the main screen and the subscreen by the optical system for projecting in the projection type display device of the first embodiment of the present invention.
Figure 8:
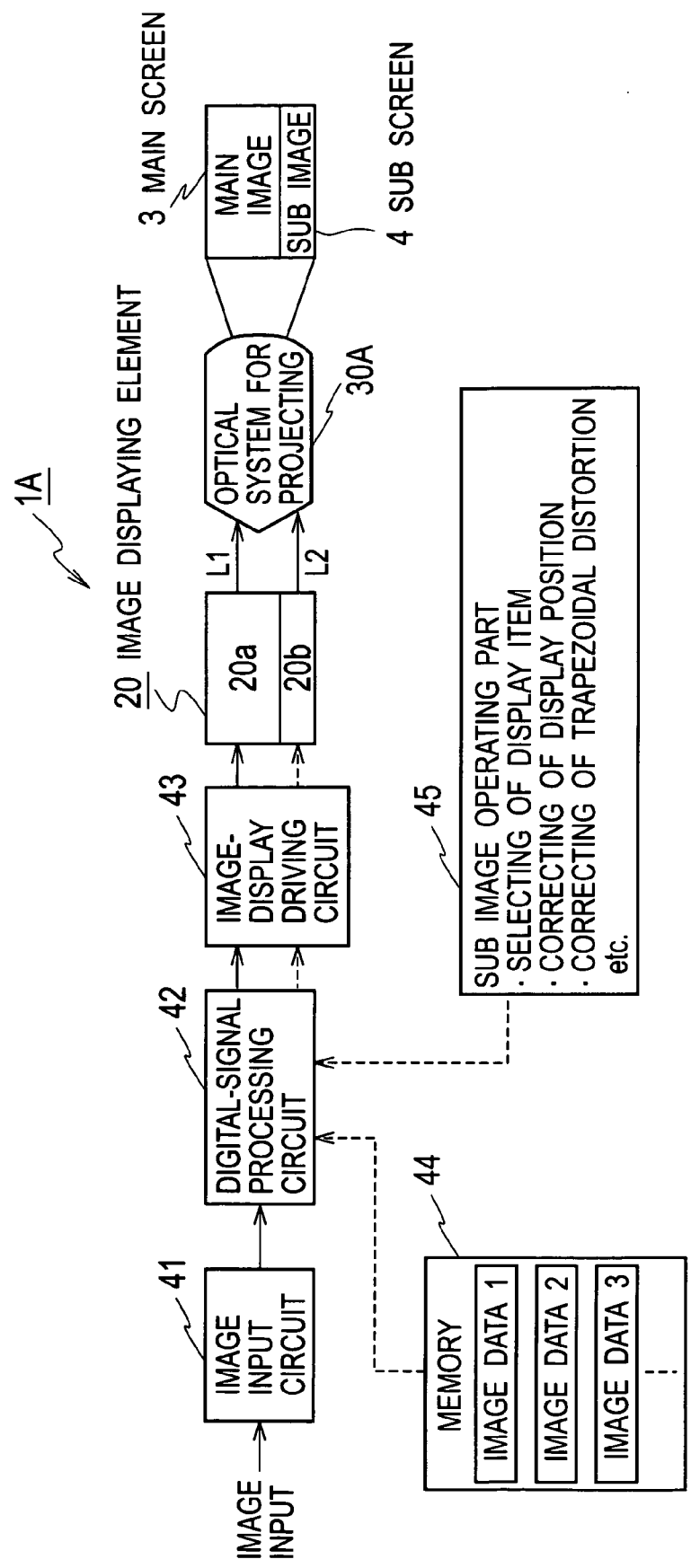
FIG. 8 is a block diagram showing an overall structure of the projection type display device of the first embodiment of the present invention, and explaining an image displaying method of the present invention.

FIG. 4A is a front view showing the appearance of the projection type display device in accordance with the first embodiment (first and second modifications of the first embodiment) of the present invention. FIG. 4B is a right side view showing the appearance of the projection type display device of FIG. 4A. FIG. 5 is a view typically showing the arrangement of respective optical members in the projection type display device of the first embodiment of the present invention. In connection with the projection type display device of the first embodiment, FIG. 6 is a view typically showing a first form where main and sub image areas of a liquid crystal panel are respectively projected on main and subscreens by an optical system for projecting (referred to as "projection optical system"). Further, FIG. 7 is a view typically showing a second form where the main and sub image areas of the liquid crystal panel are respectively projected on the main and subscreens by the projection optical system. Furthermore, FIG. 8 is a block diagram showing an overall structure of the projection type display device of the first embodiment of the present invention, and explaining an image displaying method of the present invention.

In FIGS. 4A and 4B, a reference number 1A denotes the projection type display device of the first embodiment of the present invention. In connection, a reference number 1B denotes the projection type display device in accordance with the first modification of the first embodiment, while a reference number 1C denotes the projection type display device in accordance with the second modification of the first embodiment. As shown in these figures, the projection type display device 1A (1B, 1C) has a cabinet 2 in the form of a box. The cabinet 2 is mounted on a floor surface U through a bottom surface 2a. In the cabinet 2, the side of its top surface 2b constitutes an image projection side of the display device 1A.

On an interior side 2c of the above cabinet 2, there is a single optical unit having an optical system 10 for illumination (referred to as "illumination optical system" after), a liquid crystal panel 20 as one kind of image displaying element (light modulation element) and a projection optical system 30A (30B, 30C).

Suppose that in FIGS. 4A and 4B the projection type display device 1A of the first embodiment includes the later-mentioned projection optical system 30A while the projection type display devices 1B, 1C of the first and second modifications of the first embodiment include the later-mentioned projection optical systems 30B, 30C, respectively.

Opposing an emitting part of the projection optical system 30A (30B, 30C), a main screen 3 using a light transmissive screen (as the first screen) is mounted on the top surface 2b of the cabinet 2 through a main-screen support frame 5. In addition, a subscreen 4 using a light transmissive screen (as the second screen) is mounted on the top surface 2b of the cabinet 2 through a subscreen support frame 6.

Then, it is required for the main screen 3 and the subscreen 4 that at least respective parts are positioned in an area of projection light flux emitted from the emitting part of the projection optical system 30A (30B, 30C). In addition, it is important that the subscreen 4 is arranged in such a position that the main screen 3 is not overlapped with a subscreen's shadow (not shown) that would be produced by the projection light flux emitted from the emitting part of the projection optical system 30A (30B, 30C) toward the subscreen 4.

In the arrangement where the projection optical system 30A (30B, 30C) is positioned on the back side of the main screen 3 and the subscreen 4, first and second light fluxes L1, L2 emitted from the emitting part of the optical system 30A (30B, 30C) are transmitted through the screens 3, 4 from their respective rear surfaces toward the front surfaces. Subsequently, later-mentioned main and sub images by the fluxes L1, L2 are displayed on the front surfaces of the screens 3, 4.

Since the projection type display device 1A (1B, 1C) of the first embodiment (the first and second modifications) is constructed as a rear-projection display device, the position of a user (viewer) is established on the front side of the screens 3, 4.

As shown in FIG. 5 in enlargement, the illumination optical system 10 comprises a light source 11 emitting white light by means of a discharge lamp such as an extra high pressure mercury lamp, a concave reflecting mirror 12 reflecting the light emitted from the light source 11 and further converting the light to substantial parallel light, and a lighting lens 13 transmitting (or reflecting) the substantial parallel light from the concave reflecting mirror 12 thereby to illuminate the liquid crystal panel 20.

In the illumination optical system 10, the light source 11 may be formed by a semiconductor light source, for example, LED (Light Emitting Diode) and semiconductor laser.

In the liquid crystal panel 20, a main image area (the first image area) 20a for displaying a main image (the first image) and a sub image area (the second image area) 20b for displaying a sub image (the second image) are formed in one body. The main image area 20a is positioned on the upper side of the panel 20 while the sub image area 20b is positioned below the main image area 20a.

The liquid crystal panel 20 may be either one of the shown light-transmissive liquid crystal panel transmitting the light from the illumination optical system 10 and a reflective liquid crystal panel reflecting the light from the optical system 10 although a projection type display device using the reflective liquid crystal panel is not shown in the figure.

The projection optical system 30A comprises a projection lens 31 and an aspherical concave mirror 32. In operation, the projection lens 31 magnifies and projects the main image displayed on the main image area 20a of the liquid crystal panel 20 and the sub image displayed on the sub image area 20b. On the other hand, the aspherical concave mirror 32 reflects the first light flux L1 by the main image transmitted through the projection lens 31 thereby to project the first light flux L1 on the main screen (the first screen) 3 and also reflects the second light flux L2 by the sub image transmitted through the projection lens 31 thereby to project the second light flux L2 on the subscreen (the second screen) 4 below the main screen 3. That is, the aspherical concave mirror 32 functions as the emitting part to project the light from the light source 11 to the main screen 3 and the subscreen 4 outside the cabinet 2 (FIGS. 4A and 4B) through the liquid crystal panel 20.

Then, as the above-mentioned first and second light fluxes L1, L2 are obtained since the projection light flux from the projection optical system 30A is sectioned by the main image area 20a and the sub image area 20b of the liquid crystal panel 20, it is obvious from the figure that these fluxes are not provided by the expensive video split device 120 (FIGS. 1, 3A and 3B) in prior art.

In arrangement, both of the projection optical system 30A and the liquid crystal panel 20 are arranged on a first optical axis K1, while the projection lens 31 is arranged on a second optical axis K2 paralleled to the first optical axis K1 and also displaced therefrom downwardly by a distance δ.

Correspondingly, the projection light flux (the first and second light fluxes L1, L2) transmitted through the projection lens 31 of the optical system 30A travels obliquely downward and makes an incidence on the aspherical concave mirror 32. Then, the incident flux is reflected by the aspherical concave mirror 32 and further projected toward respective back surfaces of the main screen 3 and the subscreen 4 obliquely upward. Therefore the illustrated projection optical system 30A functions as an optical system for oblique projecting.

Regarding the arrangement of the projection lens 31, it may be alternatively arranged on the first optical axis K1 although it is not shown in the figures.

As for the subscreen 4, there may be available PNLC (Polymer Network Liquid Crystal) film where liquid crystal and network-like polymer molecule are sandwiched between two sheets of plastic films with transparent electrodes.

With the adoption of PNLC film for the subscreen 4, when displaying the sub image on it, the voltage on PNLC film is controlled to switch the color white for displaying the sub image. On the other hand, when it is not required to display the sub image on the subscreen 4, the voltage on PNLC film is controlled to make it transparent in view of adding charm to the displaying of the main screen 3.

Besides PNLC film for the subscreen 4, there may be available any element enabling its condition to be switched between transparent state and confusional state, element using PDLC (Polymer Dispersed Liquid Crystal), product named "UMU" (produced by Nippon Sheet Glass Co., Ltd.) and so on.

In addition, by selecting another screen material for the subscreen 4, it is possible to establish its specifications, such as screen gain and view angle, different from those of the main screen 3.

Returning to FIGS. 4A and 4B, the cabinet 2 has an emission port 2b1 formed so as to penetrate the top surface 2b in order to lead the first and second light fluxes L1, L2 emitted from the optical system 30A to the main screen 3 and the subscreen 4.

On the top surface 2b of the cabinet 2, the main screen 3 is arranged at a point distant from the emitting part of the projection optical system 30A. On the other hand, the subscreen 4 is arranged substantially parallel to the main screen 3 at a point close to the emitting part of the optical system 30A. In other words, the subscreen 4 is arranged closer to the emitting part of the projection optical system 30A than the main screen 3.

Correspondingly, a first shortest linear distance D1 between the emission port 2b1 and the main screen 3 along the top surface 2b of the cabinet 2 is set to be larger than a second shortest linear distance D2 between the emission port 2b1 and the subscreen 4 (i.e. D1>D2). In point of adopting the single projection lens 31 in common with the main screen 3 and the subscreen 4, it is preferable that the position of the subscreen 4 in relation to the main screen 3 is established within the range allowing a blurring of the sub image displayed on the subscreen 4 in enlargement.

Therefore a magnification ratio $\alpha_1$ of the main image area 20a of the liquid crystal panel 20 to the main screen 3 is set to be larger than a magnification ratio $\alpha_2$ of the sub image area 20b to the subscreen 4, that is, $\alpha_1 > \alpha_2$.

The illumination ratio of the second light flux L2 emitted from the emitting part of the optical system 30A to the first light flux L1 (i.e. L2/L1) becomes $(D1/D2)^2$ since respective illuminations are inversely proportional to the squares of the first and second shortest linear distances D1, D2. Accordingly, since the image is displayed on the subscreen 4 brightly rather than the main screen 3, it is possible to bring the displaying on the subscreen 4 into prominence.

Since the subscreen 4 displaying an image brightly is located behind the main screen 3 (on the side of the emission port 2b1) in view from a user, it is possible for the user to afford a feeling that an image projected on the main screen 3 is floating in three dimensions.

Suppose that for example the first shortest linear distance D1 is 220 nm and the second shortest linear distance D2 is 120 nm. Then, if the spread of light flux emitted from the emission port 2b1 at the position of the second shortest linear distance D2 is represented by a circle with a radius "r", then the spread of light at the position of first shortest linear distance D1 becomes a circle with a radius 1.83r.

In this regard, since the light is intensified in inverse proportion to the square of a distance from the emission port 2b1, the intensity of light at the position of the second shortest linear distance D2 becomes 3.34 times as much as the intensity of light at the position of the first shortest linear distance D1.

In addition, if the material of the subscreen 4 is identical to that of the main screen 3, the image on the subscreen 4 is visible with an increased brightness per unit area in comparison with the image on the main screen 3 although there is no difference in the total amount of projected light in between the subscreen 4 and the main screen 3.

Note that if required to reduce the brightness of the subscreen 4, one can adopt any one of the following countermeasures of: darkening an image on the subscreen 4 electrically; darkening an image on the subscreen 4 with an optical filter (not shown) optically; and switching to a different material for the subscreen 4.

Also, on the top surface 2b of the cabinet 2, there are the main-screen support frame 5 for supporting the circumference of the rectangular main screen 3 and the subscreen support frame 6 for supporting the circumference of the rectangular subscreen 4, both of which are standing on the cabinet 2 substantially vertically.

Due to the rear-projection type display device, the main-screen support frame 5 and the subscreen support frame 6 are formed by light-permeable members, such as glass and acryl. In the main-screen support frame 5, its portion abutting on the lower part of the main screen 3 is adapted so as to make the subscreen 4 and the subscreen support frame 6 visible through the frame 5 in view from the front side of the main screen 3.

Therefore the second light flux L2 projected on the subscreen 4 intersects with the above frame portion abutting on the lower part of the main screen 3 after passing through the subscreen 4.

Upon establishing a substantially rectangular emission surface of the optical system 30A corresponding to the liquid crystal panel 20 as one end face, namely, a pyramidal space which is defined between the above one end face and the other end face being an extension obtained by virtually connecting the periphery of the one end face with the periphery of the subscreen 4 intersects with the lower area of the main-screen support frame 5, that is, the light-permeable member outside the main screen 3.

In connection with the first embodiment, without being supported by the main-screen support frame 5, the main screen 3 may be supported on only both sides thereof by not-shown main-screen support members while defining a space below the main screen 3.

In addition, since a height $H_{3b}$ from the floor surface U as a reference position to the lower end 3b of the main screen 3 is set to be larger than a height $H_{4a}$ from the floor surface U to the upper end 4a of the subscreen 4, the main screen 3 and the subscreen 4 do not overlap each other in both front and side views of the display device 1A, thereby allowing the main image displayed on the main screen 3 and the sub image displayed on the subscreen 4 to be easily viewable.

As the sub image displayed on the subscreen 4 is in the vicinity of the emitting part of the projection optical system 30A, it is possible to accomplish the bright displaying of the sub image. In addition, as the sub image is displayed on the subscreen 4 which is arranged behind the main screen 3 displaying the main image in view from a user (viewer), it is possible for the viewer to afford a feeling that an image projected on the main screen 3 is floating in three dimensions. Thus, owing to the provision of the images with a depth feeling (stereoscopic effect), it is possible to provide the display device with improved added-value.

As an example, if using a Full-HD type liquid crystal panel 20 (1080×1920 pixels) as shown in FIGS. 6 and 7, then a cinemascope having 817×1920 pixels in the number of pixels is established for the main-image area 20a, while the sub-image area 20b is established so as to have (1080−817)×1920 pixels.

When the projection optical system 30A projects the main-image area 20a and the sub-image area 20b on the main screen 3 and the subscreen 4 in enlargement simultaneously, the main image such as moving picture is displayed in enlargement on the main screen 3 at the magnification ratio $\alpha_1$ to the main-image area 20a. On the other hand, the sub image (e.g. time display, logos) is displayed on the subscreen 4 while a masking part 4m is masking the image's periphery to narrow its transverse width (in the first form).

Alternatively, as shown in FIG. 7, there is a case that a dynamic picture image (e.g. counterprogram against the main image) is enlarged and displayed on the subscreen 4 at the magnification ratio $\alpha_2$ to the sub-image area 20b of the liquid crystal panel 20 (in the second form).

In forming the masking part 4m in the subscreen 4 horizontally, it is noted that there are one method of masking the sub-image area 20b of the liquid crystal panel 20 in black electrically and another method of masking the sub-image area 20b with the use of a not-shown masking member physically.

The above-constructed projection type display device 1A of the first embodiment and the image displaying method of this embodiment will be described with reference to FIG. 8.

As typically shown in FIG. 8, the projection type display device 1A of the first embodiment comprises an image input circuit 41, a digital-signal processing circuit 42, an image-display driving circuit 43, an image displaying element (liquid crystal panel) 20, the projection optical system 30A, the main screen 3 and the subscreen 4, each of which is connected to the next element electrically and optically in this order. The display device 1A further includes a memory 44 and a sub-image operating part 45, both of which are connected to the digital-signal processing circuit 42.

According to the image displaying method of this embodiment, an image input providing the main image (referred to as "first video signal" hereinafter) is inputted to the digital-signal processing circuit 42 through the image input circuit 41.

Meanwhile, a user operates the sub-image operating part 45 to select a display image for the subscreen 4 from among respective image data 1, 2, 3, . . . stored in the memory 44. Then, the selected image data for the sub image (referred to as "second video signal") is inputted to the digital-signal processing circuit 42.

By further operating the sub-image operating part 45, the user can give instructions of correcting the display position in the subscreen 4, correcting the trapezoidal distortion in the subscreen 4, etc. Based on user's instructions, the first and second video signals are subjected to digital signal processing at the digital-signal processing circuit 42.

Subsequently, the image displaying element (liquid crystal panel) 20 is operated by the image-display driving circuit 43, based on the first and second video signals from the digital-signal processing circuit 42. As a result, at the main-image area 20a in the image displaying element 20, light from the light source 11 is modulated on the basis of the first video signal image, thereby producing the first light flux L1. On the other hand, at the sub-image area 20b in the image displaying element 20, the light is also modulated on the basis of the second video signal, thereby producing the second light flux L2. Successively, by means of the first and second light fluxes L1 and L2 emitted from the emitting part of the projection optical system 30A, the main image displayed on the main-image area 20a is projected on the main screen 3 while the sub image displayed on the sub-image area 20b is projected on the subscreen 4.

Then, the subscreen 4 functions as another display independent of the main display 3, thereby allowing motion pictures from broadcast, texts from networks, etc. to be displayed even when the main screen 4 is not used.

Note that if the light source 11 (FIG. 5) is lowered in brightness under condition of activating only the subscreen 4 in order to display textual information etc. (i.e. nonuse of the main screen 3), it is possible to drive the display device 1A with low power.

Although the projection type display device 1 is mounted on the floor U in the first embodiment, the same device 1 may be suspended from a not-shown ceiling while maintaining the technical idea of the first embodiment. In addition, the vertical arrangement between the main-image area 20a and the sub-image area 20b may be turned upside down and correspondingly and the arrangement of the main screen 3 and the subscreen 4 may be turned upside down while maintaining the technical idea of the first embodiment.

The first and second modifications of the first embodiment will be described with reference to FIGS. 4A, 4B, 9 and 10.

Figure 9:
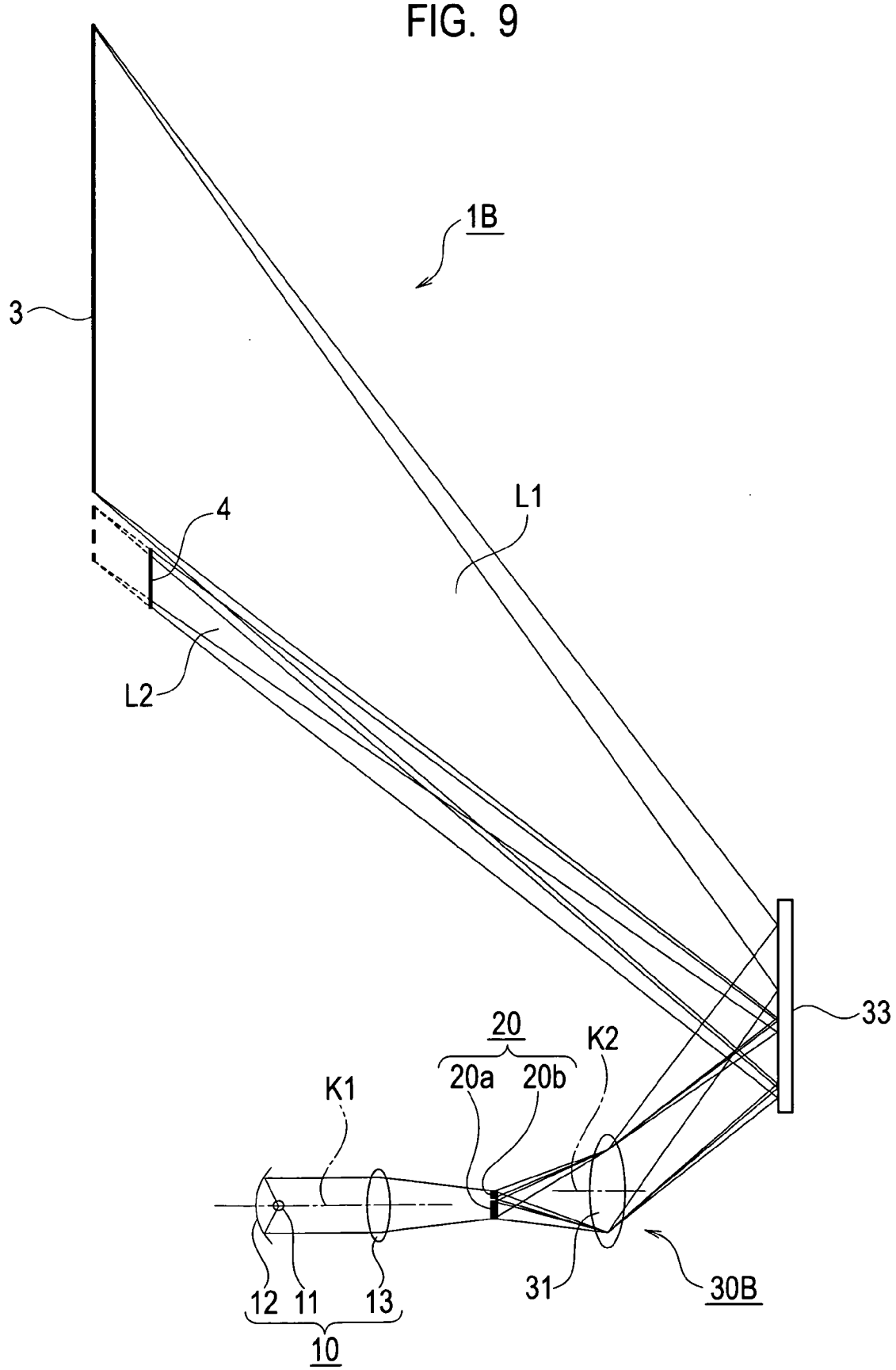
FIG. 9 is a view typically showing the arrangement of respective optical members in the projection type display device of the first modification as a result of modifying the first embodiment of the present invention partially.
Figure 10:
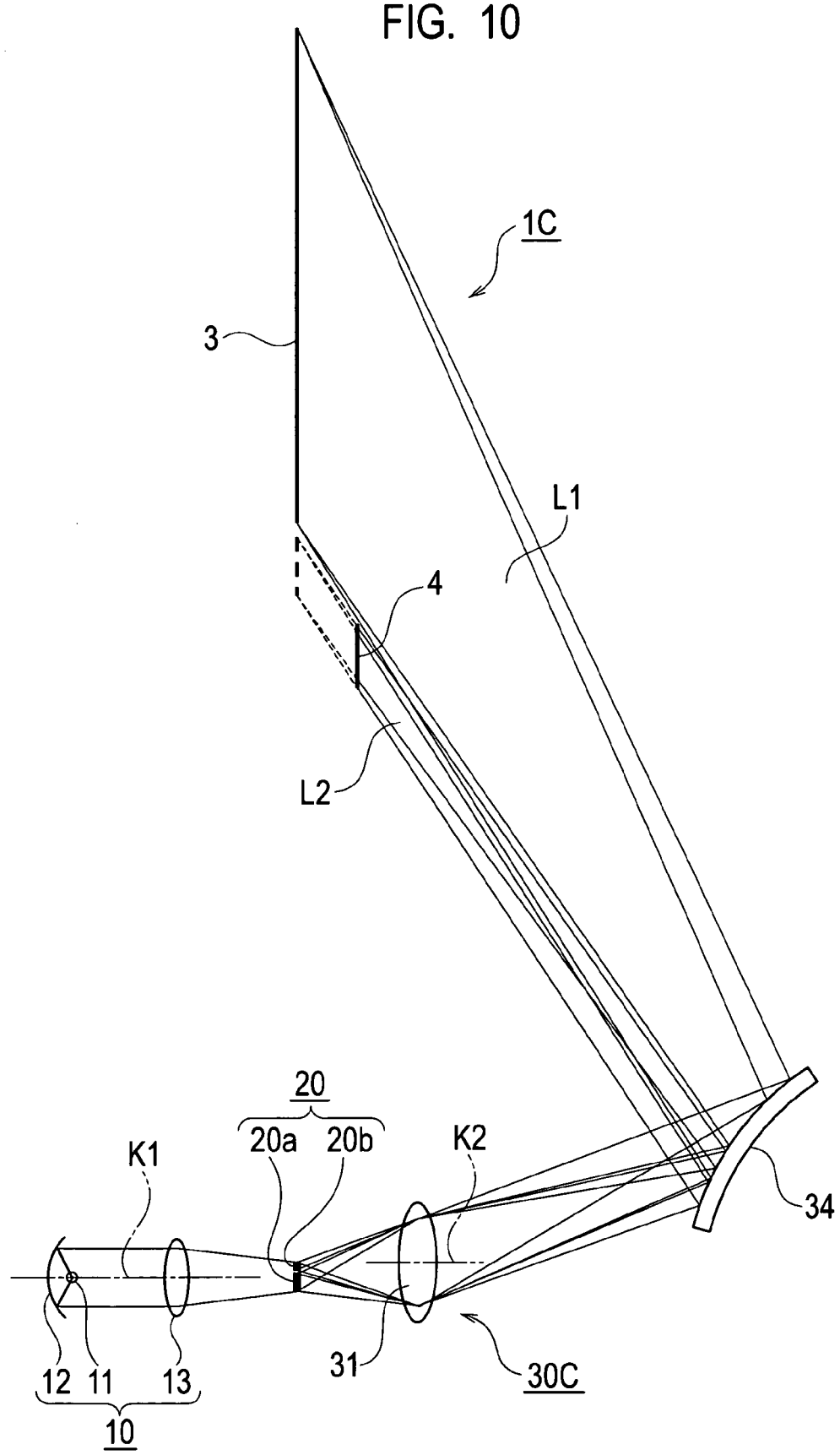
FIG. 10 is a view typically showing the arrangement of respective optical members in the projection type display device of the second modification as a result of modifying the first embodiment of the present invention partially.

FIG. 9 is a view typically showing the arrangement of respective optical members in the projection type display device of the first modification as a result of modifying the first embodiment partially. Similarly, FIG. 10 is a view typically showing the arrangement of respective optical members in the projection type display device of the second modification as a result of also modifying the first embodiment partially.

As shown in FIGS. 4A, 4B and 9, the projection type display device 1B of the first modification is different from the first embodiment in the vertical arrangement of the liquid crystal panel 20 and the structure of the projection optical system 30B.

In detail, according to the first modification, the vertical arrangement between the main-image area 20a and the sub-image area 20b is turned upside down in the liquid crystal panel 20.

The projection optical system 30B comprises the projection lens 31 and a flat mirror 33 that reflects the first light flux L1 transmitted through the projection lens 31 to project the main image to the upper main screen (the first screen) 3 and reflects the second light flux L2 to project the sub image to the lower subscreen (the second screen) 4 below the main screen 3. The flat mirror 33 functions as the emitting part to project the light from the light source 11 to the main screen 3 and the subscreen 4 outside the cabinet 2 (FIGS. 4A and 4B) through the liquid crystal panel 20.

Also in the first modification, similarly to first embodiment, the projection light flux (the first and second light fluxes L1, L2) transmitted through the projection lens 31 of the optical system 30B travels obliquely downward and makes an incidence on the flat mirror 33. Then, the incident flux is reflected by the flat mirror 33 and further projected toward respective back surfaces of the main screen 3 and the subscreen 4 obliquely upward. Therefore the illustrated projection optical system 30B functions as an optical system for oblique projecting.

In FIG. 9, the projection lens 31 is arranged on the second optical axis K2 in parallel with the first optical axis K1 of the optical system 10 and the liquid crystal panel 20. Regarding the arrangement of the projection lens 31, it may be alternatively arranged on the first optical axis K1, although it is not shown in the figures.

Also in the second modification, as shown in FIGS. 4A, 4B and 10, the projection type display device 1C is different from the first embodiment in the vertical arrangement of the liquid crystal panel 20 and the structure of the projection optical system 30C.

In detail, according to the second modification, the vertical arrangement between the main-image area 20a and the sub-image area 20b is turned upside down in the liquid crystal panel 20.

The above-mentioned projection optical system 30C comprises the projection lens 31 and an aspherical convex mirror 34 that reflects the first light flux L1 transmitted through the projection lens 31 to project the main image to the upper main screen (the first screen) 3 and reflects the second light flux L2 to project the sub image to the lower subscreen (the second screen) 4 below the main screen 3. The aspherical convex mirror 34 functions as the emitting part to project the light from the light source 11 to the main screen 3 and the subscreen 4 outside the cabinet 2 (FIGS. 4A and 4B) through the liquid crystal panel 20.

Also in the second modification, similarly to first embodiment, the projection light flux (the first and second light fluxes L1, L2) transmitted through the projection lens 31 of the optical system 30C travels obliquely downward and makes an incidence on the aspherical convex mirror 34. Then, the incident flux is reflected by the aspherical convex mirror 34 and further projected toward respective back surfaces of the main screen 3 and the subscreen 4 obliquely upward. Therefore the illustrated projection optical system 30C also functions as an optical system for oblique projecting.

In FIG. 10, the projection lens 31 is arranged on the second optical axis K2 in parallel with the first optical axis K1 of the optical system 10 and the liquid crystal panel 20. Regarding the arrangement of the projection lens 31, it may be alternatively arranged on the first optical axis K1 although it is not shown in the figures.

Figure 1:
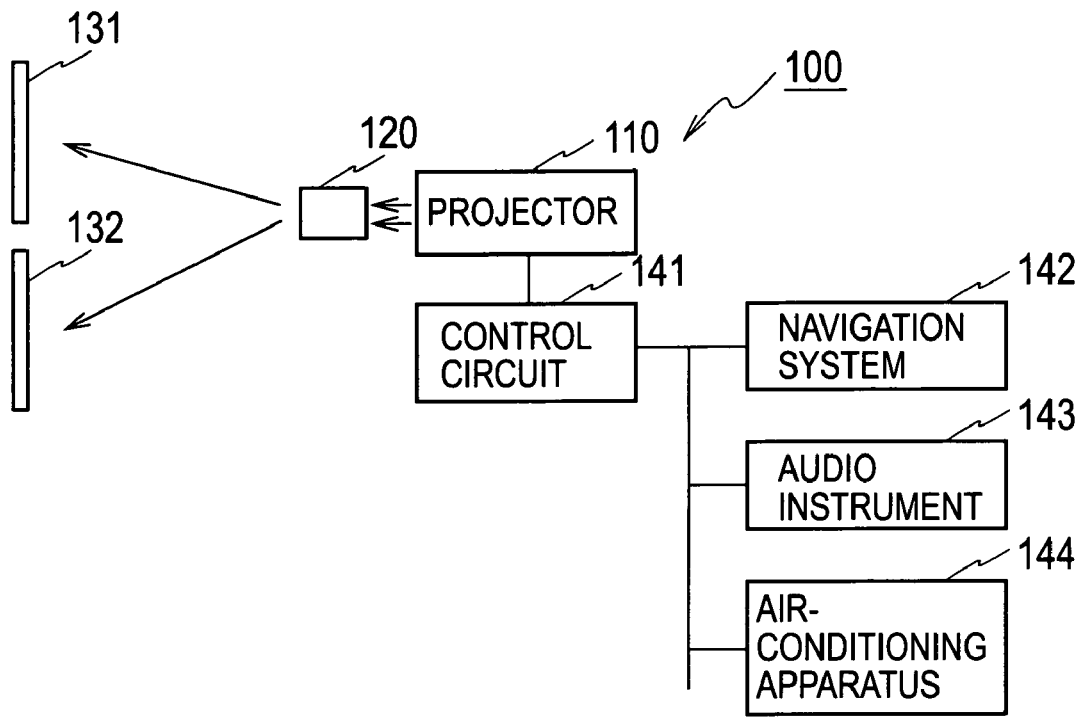
FIG. 1 is a structural view showing a display system as an example of the conventional projection type display device.
Figure 2:
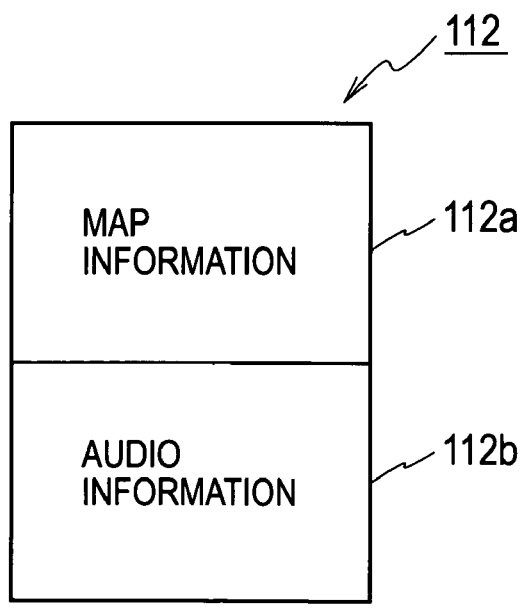
FIG. 2 is a view showing images displayed in a liquid crystal panel of a projector of FIG. 1.
Figure 3A:
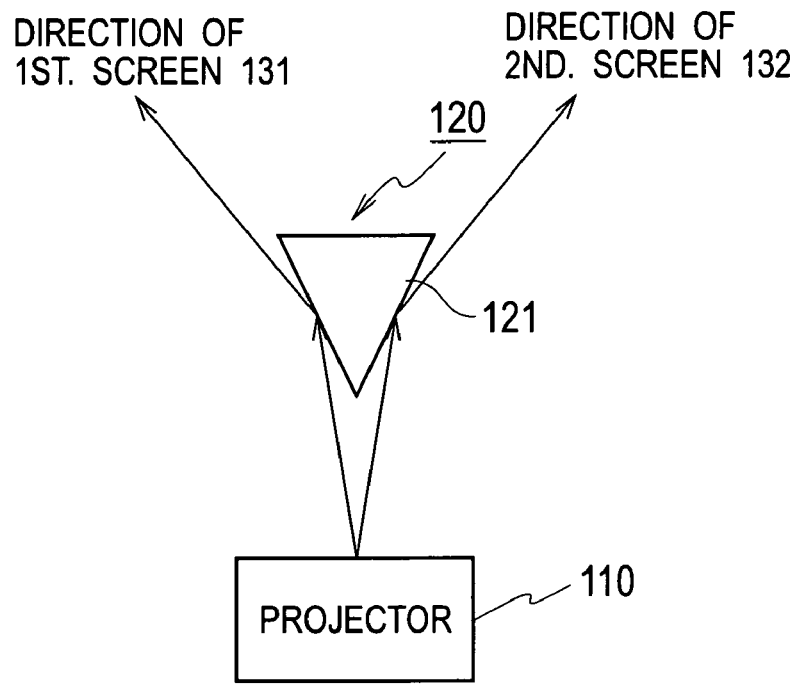
FIGS. 3A and 3B are views each showing a video split device of FIG. 1.
Figure 3B:
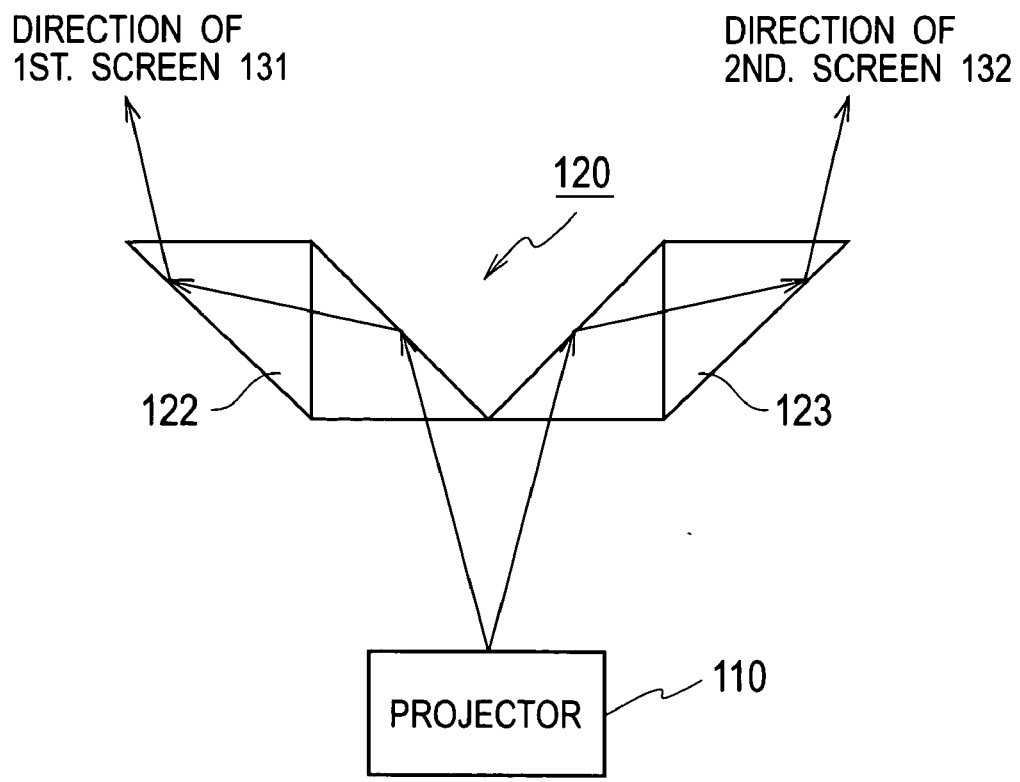

As mentioned above, throughout the first embodiment (including the first and second modifications), as the subscreen 4 is arranged close to the emitting part of the optical system 30A (30B, 30C) in comparison with the main screen 3 in the arrangement of projecting the first and second images displayed on the first and second image areas 20a, 20b established in the single image displaying element (e.g. liquid crystal panel) onto the main screen 3 and the subscreen 4 by means of the projection light flux emitted from the emitting part of the optical system 30A (30B, 30C), it is possible to provide the projection type display device 1A (1B, 1C) with a simple structure at a low price without using the expensive video split device 120 using the prism(s) (FIGS. 1, 3A and 3B).

In addition, since the main screen 3 and the subscreen 4 do not overlap each other when viewing them from the front and the lateral side, the main image displayed on the main screen 3 and the sub image displayed on the subscreen 4 are easily viewable. Further, since the second image displayed on the subscreen 4 is in close vicinity of the emitting part of the projection optical system 30A (30B, 30C), a bright displaying form can be accomplished.

Still further, since the first and second images projected to the screens 3, 4 are provided with a depth feeling (stereoscopic effect) by differentiating the positions of the main screen 3 and the subscreen 4 from each other, it is possible to provide the projection type display device 1A (1B, 1C) with improved added-value and user-friendliness.

According to the projection type display device 1A (1B, 1C) of the first embodiment (including the first and second modifications), with the use of light-permeable screens for the screens 3, 4, the first and second light fluxes L1, L2 transmitted through the projection lens 31 of the optical system 30A (30B, 30C) are respectively reflected by any of the aspherical concave mirror 32, the flat mirror 33, and the aspherical convex mirror 34, each forming the emitting part of the optical system, and further projected toward respective back surfaces of the screens 3, 4 obliquely. Therefore, with a shortened depth dimension, it is possible to miniaturize the rear-projection type display device.

[$2^{nd}$. Embodiment]

FIGS. 11A and 11B are left side and front views each showing the appearance of the projection type display device of the second embodiment (including the first and second modifications) of the present invention.

In the second embodiment, elements identical to those of the first embodiment are indicated with the same reference numerals, respectively. The other elements different from those of the first embodiment will be indicated with new reference numerals and described below.

As shown in these figures, the projection type display device 1D (1E, 1F) of the second embodiment (including the first and second modifications) has the cabinet 2 in the form of a box, similarly to the first embodiment. The cabinet 2 is mounted on the floor surface U through the bottom surface 2a. In the cabinet 2, the side of the top surface 2b constitutes an image projection side of the display device 1D.

On an interior side 2c of the above cabinet 2, there is a single optical unit having the illumination optical system 10, the image displaying element using e.g. a liquid crystal panel (referred to as "liquid crystal panel") 20, and the projection optical system 30A (30B, 30C).

Suppose that in FIGS. 11A and 11B the projection type display device 1D of the second embodiment includes the above-mentioned projection optical system 30A while the projection type display devices 1E, 1F of the first and second modifications of the second embodiment include the above-mentioned projection optical systems 30B, 30C, respectively.

We now describe features of the projection type display device 1D (1E, 1F) of the second embodiment (the first and second modifications) different from the first embodiment.

Opposing the emitting part of the projection optical system 30A (30B, 30C), the main screen 3 using a light transmissive screen (as the first screen) is mounted on the top surface 2b through a main-screen support frame 2d formed integrally with the cabinet 2. In addition, the subscreen 4 using a light transmissive screen (as the second screen) is mounted on the top surface 2b through a subscreen support frame 2e formed integrally with the cabinet 2.

In connection, the main screen 3 and the subscreen 4 may be attached to a screen support frame (not shown) formed by a different body from the cabinet 2. Alternatively, as similar to the first embodiment, the main screen 3 and the subscreen 4 may be respectively attached to the main-screen support frame 5 and the subscreen support frame 6 (FIGS. 4A and 4B) made from light transmissive material such as glass and acryl.

According to the second embodiment, the main screen 3 and the subscreen 4 are together reversed so as to face in the opposite direction to the first embodiment. Therewith, the projection optical system 30A (30B, 30C) has an emitting part arranged so as to oppose respective front surfaces of the so-reversed screens 3, 4. In operation, the first and second light fluxes L1, L2 emitted from the emitting part of the optical system 30A are projected to the front surfaces of the screens 3, 4 where the main image and the sub image by the fluxes L1, L2 are displayed.

That is, the projection type display device 1D (1E, 1F) of the second embodiment (the first and second modifications) is constructed as a so-called "front-projector" type display device. Correspondingly, in the second embodiment, a user (viewer) is positioned on one side of the main screen 3 (or the subscreen 4) facing the emitting part of the optical system 30A (30B, 30C).

Also in the second embodiment, the main screen 3 is arranged in a position distant from the emitting part of the projection optical system 30A (30B, 30C) while the subscreen 4 is arranged close to the same emitting part. In other words, the subscreen 4 is arranged closer to the emitting part of the optical system 30A (30B, 30C) than the main screen 3. In addition, as similar to the first embodiment, the subscreen 4 is arranged in such a position that the main screen 3 is not overlapped with a subscreen's shadow (not shown) that would be produced by the projection light flux emitted from the emitting part 2b1 of the projection optical system 30A (30B, 30C) toward the subscreen 4.

Correspondingly, a first shortest linear distance D1 between the emission port 2b1 of the cabinet 2 and the main screen 3 is set to be larger than a second shortest linear distance D2 between the emission port 2b1 and the subscreen 4 (i.e. D1>D2).

Establishing the floor surface U for mounting the bottom surface 2a of the cabinet 2 as a reference position, a height $H_{3b}$ from the floor surface U to the lower end 3b of the main screen 3 is set to be larger than a height $H_{4a}$ from the floor surface U to the upper end 4a of the subscreen 4.

Thus, since the projection type display device 1D (1E, 1F) of the second embodiment (the first and second modifications) is provided with the same technical idea as the first embodiment, similar effects, it is possible to produce the same effects.

According to the projection type display device 1D (1E, 1F) of the second embodiment (including the first and second modifications), with the use of light-reflective screens for the screens 3, 4, the projection light flux (the first and second light fluxes L1, L2) transmitted through the projection lens 31 of the optical system 30A (30B, 30C) are respectively reflected by any of the aspherical concave mirror 32, the flat mirror 33, and the aspherical convex mirror 34, each forming the emitting part of the optical system, and further projected toward respective back surfaces of the screens 3, 4 obliquely. Therefore, with a shortened depth dimension, it is possible to miniaturize the front-projection type display device.

Here, in a modification of the first and second embodiments, the cabinet 2 (FIGS. 4A, 4B, 11A and 11B) may be equipped with a vertical motion mechanism (not shown) which allows the subscreen 4 to be retractable into the cabinet 2 as occasion demands.

In connection with this modification, while allowing the subscreen 4 to display an image on condition of being elevated to project from the cabinet 2 upwardly, an image can be displayed on only the main screen 3 under condition that the subscreen 4 is lowered into the cabinet 2. Further, in a situation where the subscreen 4 is lowered below the top surface 2b of the cabinet 2, an image may be projected to the whole display area of the main screen 3 while using all pixels forming the liquid crystal panel 20.

In another modification of the first and second embodiments, additionally, the cabinet 2 may be equipped with a not-shown rotating mechanism which rotates either the subscreen 4 and the subscreen support frame 6, 2e (the first and second embodiments) or only the subscreen 4 about its lower part (of the support frame 6, 2e or the subscreen 4) as a fulcrum.

According to the latter modification, when the subscreen 4 is not required to display any image, it is possible to prevent the projection light flux from being radiated to the subscreen 4 by rotating it toward the main screen 3. Note that in such a situation that the subscreen 4 is rotated, an image may be projected to the whole display area of the main screen 3 while using all pixels forming the liquid crystal panel 20.

Figure 12:
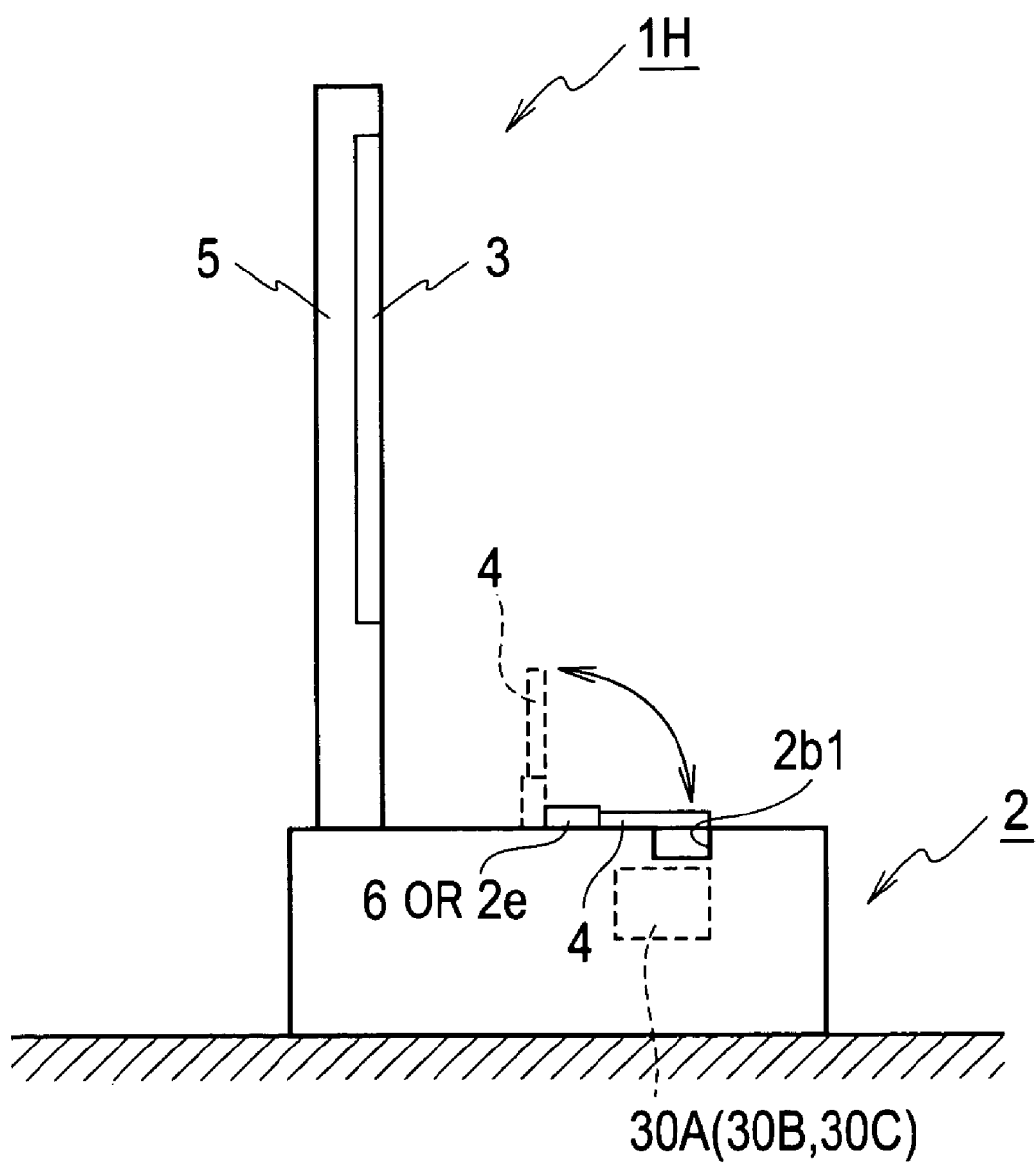
FIG. 12 is a left side view showing the appearance of a projection type display device as a result of modifying the first and second embodiments of the present invention partially.

In connection with the above structure for mounting the subscreen 4 on the cabinet 2 rotatably, it is also possible to tilt the subscreen 4 forward as shown in FIG. 12.

FIG. 12 is a left side view showing a projection type display device 1H as a result of modifying the first and second embodiments partially.

In the projection type display device 1H, as shown in FIG. 12, the subscreen 4 and the subscreen support frame 6, 2e (the first and second embodiments) may be tilted forward about the lower part of the support frame 6, 2e by 90 degrees so that the subscreen 4 closes up the emission port 2b1.

Consequently, if allowing the subscreen 4 to close up the emission port 21b in case of projecting no image to both the main screen 3 and the subscreen 4, there is no possibility of dust adhering to the projection optical system 30A (30B, 30C) so that the possibility of deteriorating the quality of projection images due to adhered dust can be reduced.

Figure 13A:
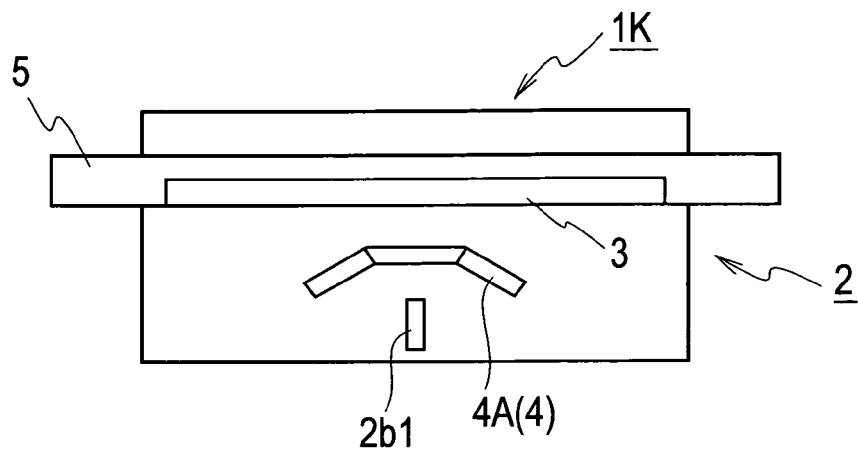
FIGS. 13A, 13B and 13C are top views showing the appearances of the other projection type display devices as a result of modifying the first and second embodiments of the present invention partially.
Figure 13B:
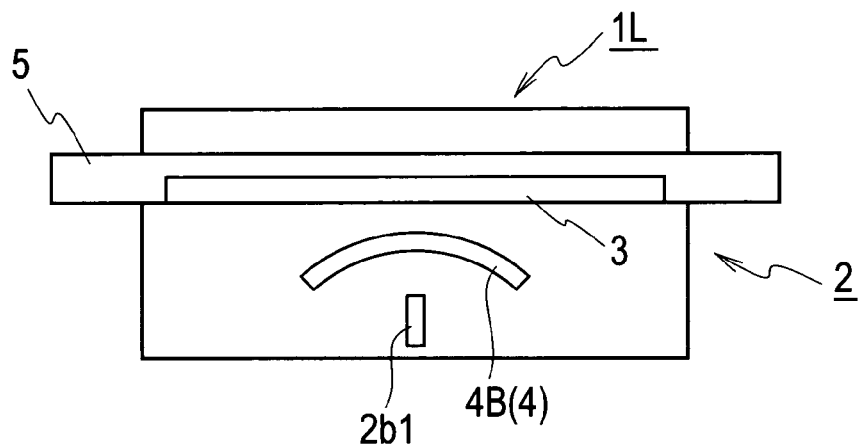
Figure 13C:
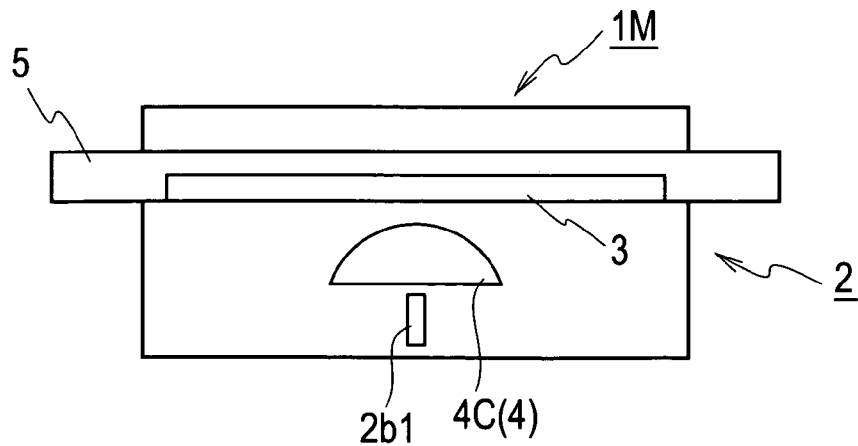

As further modifications of the first and second embodiments, the subscreen 4 may be changed so as to have respective profiles shown in FIGS. 13A, 13B and 13C.

FIGS. 13A, 13B and 13C are top views showing the appearances of respective projection type display devices as a result of modifying the first and second embodiments partially.

In FIG. 13A, the illustrated display device 1K is provided with the subscreen 4 in the form of a flexed plate, which is obtained by joining a plurality of flat screens 4 with each other.

In FIG. 13B, the illustrated display device 1L is provided with the subscreen 4 composed of a screen 4B having a semi-cylindrical surface.

In FIG. 13C, the illustrated display device 1M is provided with the subscreen 4 composed of a screen 4C having a crescentic section.

In common with the modifications of FIGS. 13A, 13B and 13C, even if viewing the subscreens 4A, 4B and 4C from any direction other than the front, the visibility of images projected to the subscreens 4A, 4B and 4C is improved.

Note that when adopting any of the subscreens 4A, 4B and 4C, it is necessary to change the second video signal to a signal consistent with the adopted subscreen. For this purpose, it is necessary to previously correct image distortion in accordance with the profile of the subscreen 4A (4B, 4C) by a geometry correction circuit (not shown) arranged behind or ahead of the digital-signal processing circuit 42 for correcting image distortion.

[$3^{rd}$. Embodiment]

Figure 14:
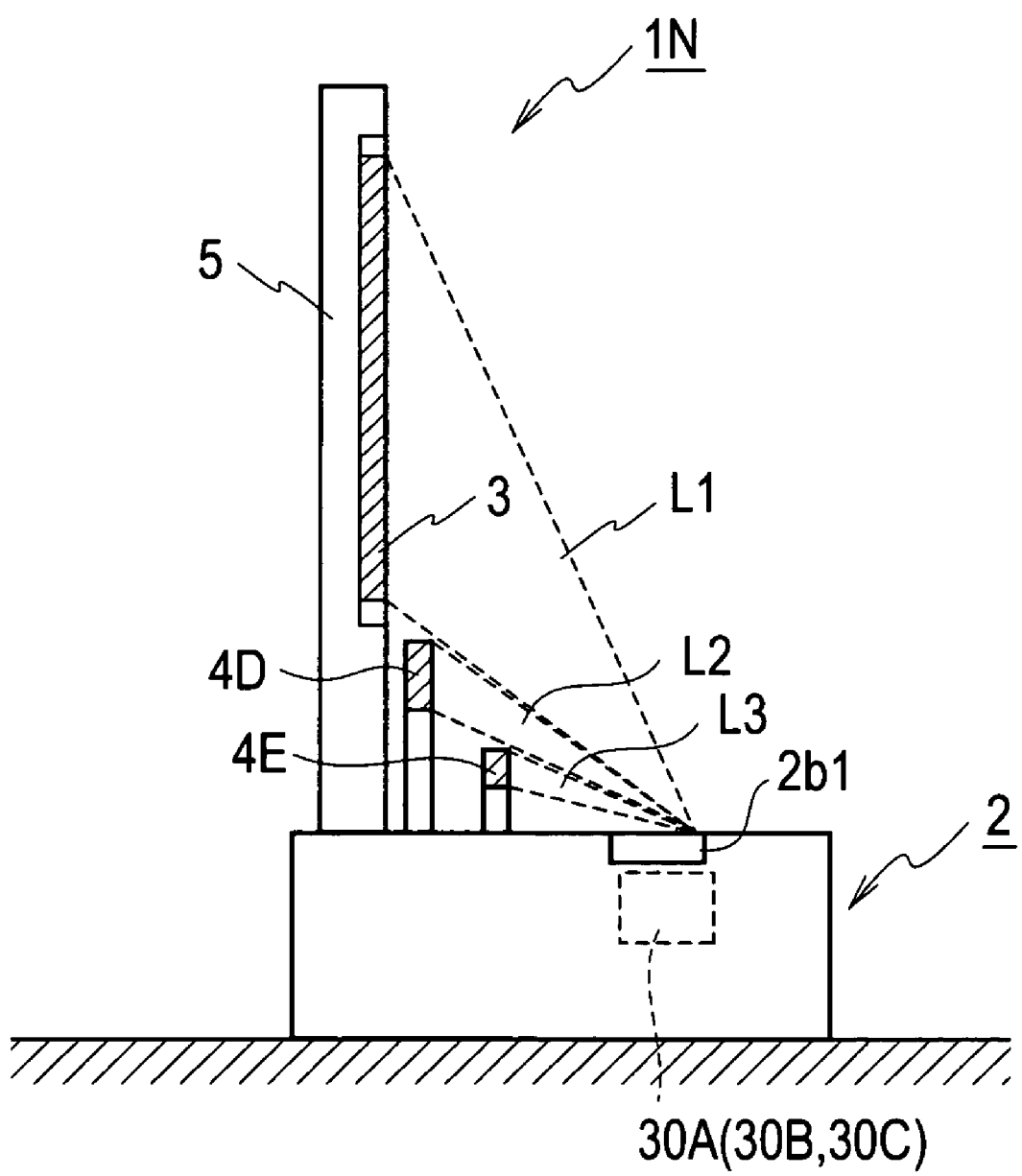
FIG. 14 is a left side view showing the appearance of a projection type display device in accordance with a third embodiment of the present invention.
Figure 15:
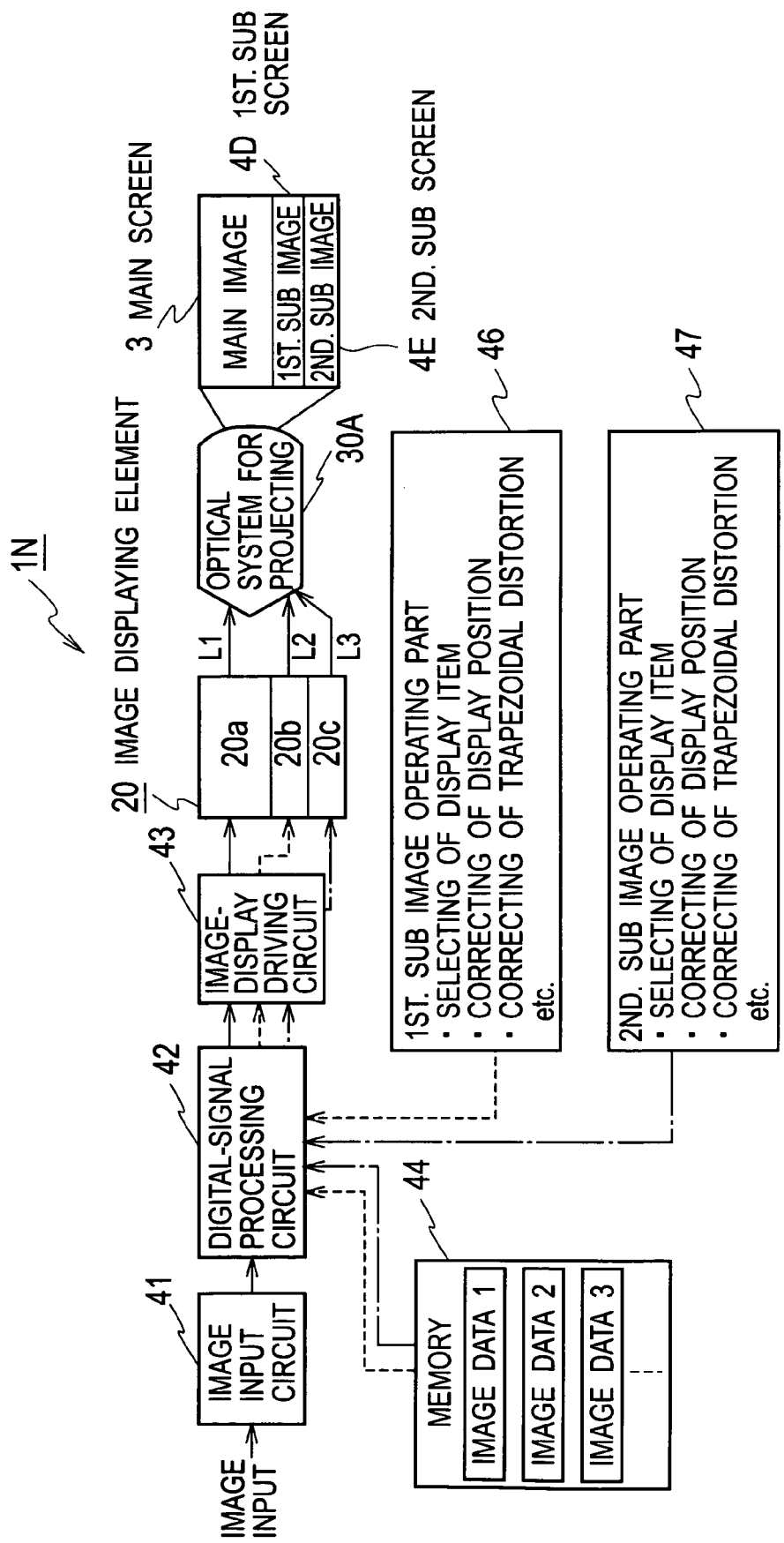
FIG. 15 is a block diagram showing an overall structure of the projection type display device of the third embodiment of the present invention, and explaining an image displaying method of the present invention.

FIG. 14 is a left side view showing the appearance of a projection type display device in accordance with the third embodiment of the present invention. FIG. 15 is a block diagram showing the constitution of the projection type display device of the third embodiment.

As one example of projection type display devices, each having a single main screen and a plurality of subscreens, the projection type display device of the third embodiment comprises one main screen and two subscreens.

In FIG. 14, the projection type display device 1N of the third embodiment has three screens, that is, the main screen 4 as the first screen, a first subscreen 4D as the second screen adjacent to the main screen 3, and a second subscreen 4E as the third screen adjacent to the emission port 2b1.

The second subscreen 4E is arranged at a low level in comparison with the first subscreen 4D. In operation, the projection optical system 30A (30B, 30C) is adapted so as to emit first, second and third fluxes L1, L2, L3 through the emission port 2b1. The emitted first, second and third fluxes L1, L2, L3 are projected to the main screen 3, the first subscreen 4D, and the second subscreen 4E, respectively.

In addition, the first subscreen 4D is arranged in such a position that the main screen 3 is not overlapped with a first subscreen's shadow (not shown) produced by the second light flux L2 emitted from the emitting part 2b1 of the projection optical system 30A (30B, 30C) toward the first subscreen 4D. Similarly, the second subscreen 4E is also arranged in such a position that the first subscreen 4D is not overlapped with a second subscreen's shadow (not shown) produced by the third flux L3 emitted from the emitting part 2b1 toward the second subscreen 4E.

With the above constitution, the projection type display device 1N can project different pictures to two subscreens 4D, 4E.

That is, since the first subscreen 4D is arranged near the main screen 3, it is possible to display high-quality images (e.g. still images, counterprogram, etc.) in the vicinity of the focus position On the other hand, since the second subscreen 4E is closer to the emission port 2b1 than the first subscreen 4D, low-quality images (e.g. caption, program information, etc.) are displayed on the subscreen 4E.

As for the image displaying method by the projection type display device 1N having two subscreens 4D, 4E, all someone has to do is to add two sub-image displaying parts to constituents of FIG. 8.

In detail, as typically shown in FIG. 15, the projection type display device 1N of the third embodiment comprises the image input circuit 41, the digital-signal processing circuit 42, the image-display driving circuit 43, the image displaying element (liquid crystal panel) 20, the projection optical system 30A, the main screen 3, the first subscreen 4D, and the second subscreen 4E, each of which is connected to the next element electrically and optically in this order. The display device 1A further includes the memory 44, a first sub-image operating part 46, and a second sub-image operating part 47, all of which are connected to the digital-signal processing circuit 42.

According to the image displaying method of this embodiment, an image input providing the main image (referred to as "first video signal" hereinafter) is inputted to the digital-signal processing circuit 42 through the image input circuit 41.

Meanwhile, a user operates the first sub-image operating part 46 and the second sub-image operating part 47 to select display images for the first and second subscreens 4D, 4E from among respective image data 1, 2, 3, . . . stored in the memory 44. Then, the selected image data for the first and second sub images (referred to as "second video signal" and "third video signal") is inputted to the digital-signal processing circuit 42.

By further operating the first and second sub-image operating parts 46, 47, the user can give instructions of correcting the display positions in the first and second subscreens 4D, 4E, correcting the trapezoidal distortions in the subscreens 4D, 4E, etc. Based on user's instructions, the first, second and third video signals are subjected to digital signal processing at the digital-signal processing circuit 42.

Subsequently, the image displaying element (liquid crystal panel) 20 is operated by the image-display driving circuit 43, based on the first, second and third video signals from the digital-signal processing circuit 42. As a result, at the main-image area 20a in the image displaying element 20, light from the light source 11 is modulated on the basis of the first video signal image, thereby producing the first light flux L1. At the sub-image area 20b in the image displaying element 20, the light is also modulated on the basis of the second video signal, thereby producing the second light flux L2. At the sub-image area 20c in the image displaying element 20, the light is also modulated on the basis of the third video signal, producing the third flux L3.

Successively, by means of the first, second and third fluxes L1, L2 and L3 emitted from the emitting part of the projection optical system 30A, the main image displayed on the main-image area 20a is projected on the main screen 3 while the first sub image displayed on the first sub-image area 20b is projected on the first subscreen 4D, and the second sub image displayed on the second sub-image area 20c is projected on the second subscreen 4E.

Figure 16:
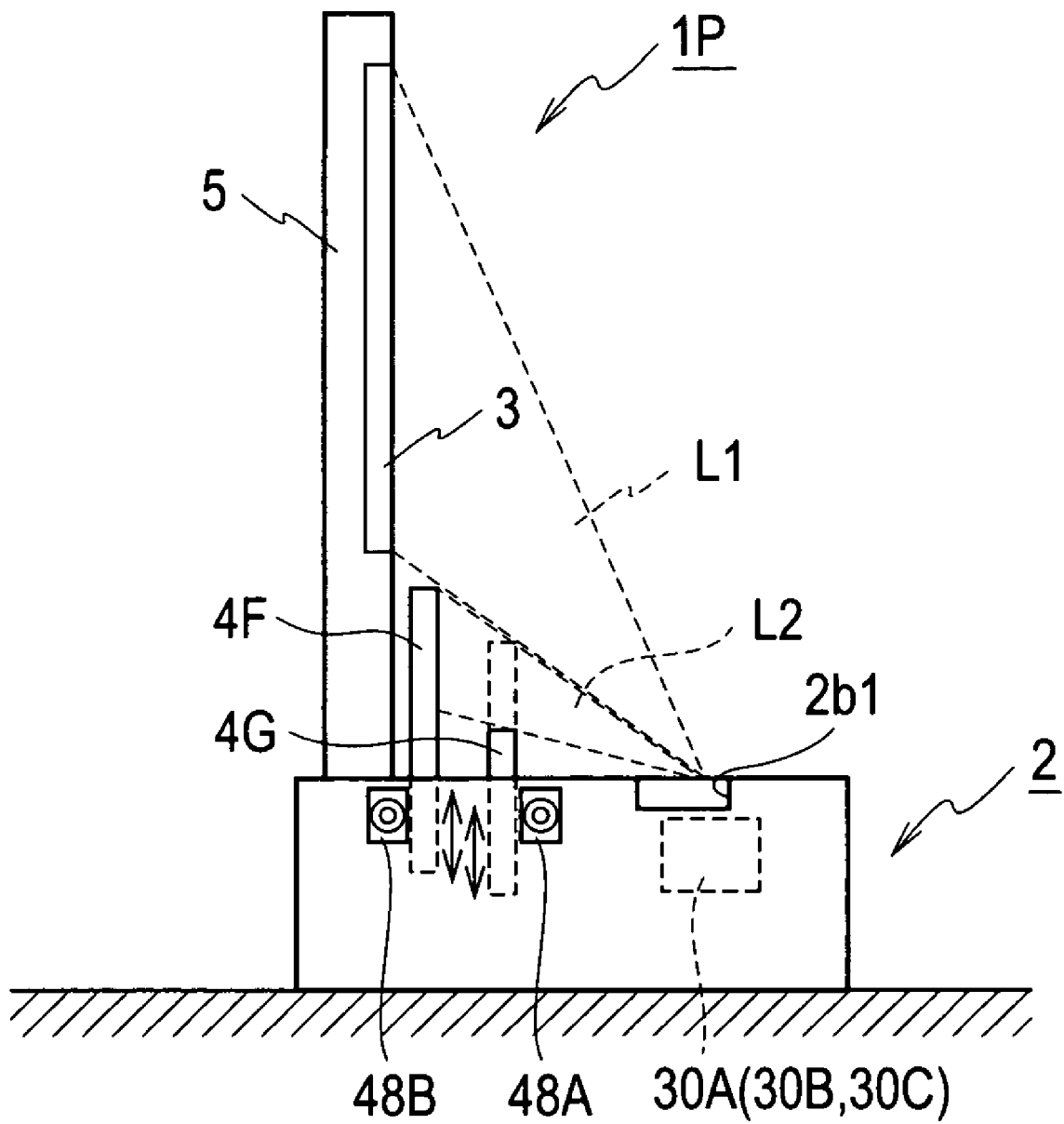
FIG. 16 is a left side view showing the appearance of a projection type display device as a result of modifying the third embodiment of the present invention partially.

FIG. 16 shows a projection type display device in a modification as a result of modifying the third embodiment partially.

As shown in the figure, the projection type display device 1P of the modification includes the main screen 3, a first subscreen 4F adjacent to the main screen 3, and a second subscreen 4G closer to the emission port 2b than the first subscreen 4F.

In addition, the projection type display device 1P is provided, in the cabinet 2, with vertical motion mechanisms 48A, 48B which move the first and second subscreen 4F, 4G up and down.

In operation, the first light flux L1 and the second light flux L2 are emitted from the optical system 30A (30B, 30C) through the emission port 2b1 and successively projected to the main screen 3 and the first or second subscreen 4F (4G). That is, the first subscreen 4F and the second subscreen 4G are juxtaposed within the irradiation area of the second light flux L2 at a distance so that it can be projected to either the first subscreen 4F or the second subscreen 4G. Also, each of the first and second subscreens 4F, 4G is adapted so as to move exclusively to each other.

Accordingly, there is no possibility that both the first subscreen 4F and the second subscreen 4G are elevated simultaneously. Thus, when emitting the second light flux L2 through the emission port 2b1, at least one of the subscreens 4F, 4G is lowered so as to allow the second light flux L2 to be projected to the other subscreen.

Since the above-mentioned projection type display device 1P is constructed so as to display images on the main screen 3, and either the first subscreen 4F or the second subscreen 4G, the image displaying method is accomplished in accordance with the procedures shown in FIG. 8. That is, the first light flux L1 upon light modulation at the main-image area 20a of the liquid crystal panel 20 is projected to the main screen 3 through the optical system 30A (30B, 30C) while the second light flux L2 upon light modulation at the sub-image area 20b of the liquid crystal panel 20 is projected to either the first subscreen 4F or the second subscreen 4G through the optical system 30A (30B, 30C).

Then, when projecting an image to the first subscreen 4F, it is possible to display high-quality images (e.g. still images, counterprogram, etc.) in the vicinity of the focus position since the first subscreen 4F is arranged near the main screen 3. On the other hand, when projecting an image to the second subscreen 4G, low-quality images (e.g. caption, program information, etc.) are displayed on the subscreen 4G since the second subscreen 4G is closer to the emission port 2b1 than the first subscreen 4F.

In the projection type display devices 1N, 1P of the third embodiment and the modification, it is also possible to make the first subscreen 4D (4F) landscape-oriented in the same direction as the long side of the main screen 3, allowing a multichannel text displaying.

In the projection type display devices 1N, 1P of the third embodiment and the modification, additionally, the subscreen closest to the emission port 2b1 may be displaceable as shown in FIG. 12 so as to close up the emission port 2b1.

Consequently, in case of projecting no image in the projection type display devices 1N, 1P of the third embodiment and the modification, it is possible to prevent dust from entering through the emission port 2b1.

[4$^{th}$. Embodiment]

FIG. 17 is a view showing the arrangement of optical members in a projection type display device in accordance with the fourth embodiment of the present invention typically.

In the fourth embodiment of FIG. 17, elements identical to those of the first and second embodiments are indicated with the same reference numerals, respectively. The other elements different from those of the first embodiment will be indicated with new reference numerals and described below.

As shown in FIG. 17, the projection type display device 1S of the fourth embodiment comprises in a not-shown cabinet: the illumination optical system 10 having the light source 11, the concave reflecting mirror 12 and the lighting lens 13; the liquid crystal panel 20 having the main-image area (the first image area) 20a for displaying the main image (the first image) and the sub-image area (the second image area) 20b for displaying the sub image (the second image) formed integrally with the main-image area 20a; and a projection lens 31' which transmits first and second light fluxes L1', L2' by the main image and sub image displayed in the liquid crystal panel 20 and further projects them to respective front surfaces of the main screen 3 and the sub screen 4 obliquely.

In the projection type display device 1S, a projection optical system 30D is formed by only the projection lens 31' (the emitting part), thereby projecting the fluxes to the screens 3, 4 located ahead of the lens 31' obliquely. That is, since the projection type display device 1S of the fourth embodiment is constructed as a rear-projection display device, the position of a user (viewer) is established on the front side of the screens 3, 4.

The illumination optical system 10 and the liquid crystal panel 20 are arranged on the first optical axis K1 similarly to the first embodiment while the projection lens 31' is arranged on a second optical axis K2' paralleled with the first optical axis K1 and somewhat displaced therefrom by a distance γ upward.

Also in the fourth embodiment, the main screen 3 is arranged in a position distant from the emitting part of the projection optical system 30D while the subscreen 4 is arranged close to the emitting part. In other words, the subscreen 4 is arranged closer to the emitting part of the optical system 30D than the main screen 3.

Thus, as the projection type display device 1S of the fourth embodiment is provided with the similar technical idea to the front-projection type display device 1D (1E, 1F) of the second embodiment (including the first and second modifications), it is possible to produce the similar effects to the second embodiment. Although the occupation area of the projection type display device 1S of the fourth embodiment is greater than that of the projection type display device 1D (1E, 1F) of the second embodiment (including the first and second modifications), the display device 1S can be manufacture at low cost by ceasing the use of the aspherical concave mirror 32, the flat mirror 33, or the aspherical convex mirror 34.

Note that the main screen 3 is set substantially parallel to the subscreen 4 throughout the above-mentioned embodiments and their modifications. Alternatively, with an arrangement where the upper part of the subscreen 4 is inclined on the opposite side of the main screen 3, the trapezoidal distortion of the sub image on display may be corrected with the use of trapezoidal-distortion correcting functions of the sub-image operating part 45 (FIG. 8) and the first and second sub-image operating parts 46, 47 (FIG. 15).

Although the image data selected from among the image data 1, 2, 3, . . . stored in the memory 44 is displayed on the subscreen 4 in common with the first to fourth embodiments and their modifications, a sub image may be displayed on the subscreen 4 with the use of image input signals different from the main image.

Throughout the above-mentioned embodiments and their modifications, the main screen 2 is arranged on the upper side of the display device, while the subscreen 4 is arranged on the lower side. Conversely, the main screen 3 may be arranged on the lower side of the display device while arranging the subscreen 4 on the upper side.

With the adoption of the above-mentioned embodiments and their modifications, it is possible to display the real-time textual information for hard-of-hearing person on the subscreen 4 with the speech recognition technology while allowing the main screen 3 to display images. Furthermore, it is possible to display FM teletext broadcast through the subscreen 4.

Finally, it will be understood by those skilled in the art that the foregoing descriptions are nothing but embodiments and various modifications of the disclosed projection type display device and the image displaying method and therefore, various changes and modifications may be made within the scope of claims.

What is claimed is:

1. A projection type display device comprising:
   a light source;
   a liquid crystal panel having a first image display area and a second image display area formed in one body and optically modulating light flux from the light source by the first image display area and the second image display area based on a first video signal and a second video signal, both inputted from an outside, thereby to produce a first image and a second image;
   a projection optical system having an emitting part and projecting respective fluxes as projection light flux, which are obtained by optically modulating the light flux by the liquid crystal panel, from the emitting part;
   a first screen for displaying the first image since the projection light flux is irradiated to the first screen;
   a second screen arranged between the emitting part and the first screen in a direction perpendicular to the first screen for displaying the second image since the projection light flux is irradiated to the second screen; and
   a support frame arranged on an outside part of the first screen to have an optical transparency, and defining respective fluxes of the projection light flux irradiated to the first screen and the second screen as a first partial flux and a second partial flux, respectively,
   wherein the second screen is arranged in such a position that the first screen is not overlapped with a shadow of the second screen which is produced since the projection light flux emitted from the emitting part is irradiated to the second screen,
   wherein an extension area of the second partial flux transmitted through the second screen intersects with the support frame.

2. The projection type display device of claim 1, wherein:
   the second screen is displaceable, and
   the projection light flux is irradiated to only the first screen on condition that the second screen is displaced.

3. The projection type display device of claim 1, wherein the second screen can be displaced to a position to cover the emitting part.

4. The projection type display device of claim 1, wherein the projection optical system includes:
   a projection lens for projecting the respective fluxes optically modulated by the liquid crystal panel in enlargement; and
   a reflecting part having an aspherical concave mirror, which can reflect the respective fluxes transmitted through the projection lens.

5. The projection type display device of claim 1, wherein the first screen and the second screen are formed by either light transmissive screens or light reflective screens.

6. An imaging displaying method comprising the steps of:
optically modulating light flux emitted from a light source at different areas in an image display area of a liquid crystal panel having a first image display area and a second image display area formed in one body, based on a first video signal and a second video signal, both inputted from an outside, thereby producing first light flux and second light flux;
emitting projection light flux containing the first light flux and the second light flux produced from an emitting part of a projection optical system;
displaying a first image based on the first video signal on a first screen arranged on an optical path of the first light flux so that at least part of the first screen intersects with the first light flux; and
displaying a second image based on the second video signal on a second screen arranged between the first screen and the emitting part on an optical path of the second light flux so that at least part of the second screen intersects with the second light flux,
wherein an extension area of the second light flux transmitted through the second screen intersects with a support frame, the support frame being arranged on an outside part of the first screen to have an optical transparency.

* * * * *